United States Patent [19]
Kawakami et al.

[11] Patent Number: 5,698,339
[45] Date of Patent: Dec. 16, 1997

[54] ANODE WITH AN ANODE ACTIVE MATERIAL-RETAINING BODY HAVING A NUMBER OF PORES DISTRIBUTED THEREIN, A RECHARGEABLE BATTERY, PROVIDED WITH SAID ANODE, AND THE PROCESS FOR THE PRODUCTION OF SAID ANODE

[75] Inventors: Soichiro Kawakami, Nara; Shinya Mishina, Kawasaki; Naoya Kobayashi, Nara; Masaya Asao, Tsuzuki, all of Japan

[73] Assignee: Canon Kabushiki Kaisha, Tokyo, Japan

[21] Appl. No.: 546,937

[22] Filed: Oct. 23, 1995

[30] Foreign Application Priority Data

Oct. 21, 1994 [JP] Japan .............. 6-256418/HEI6
Oct. 6, 1995 [JP] Japan .............. 7-260377/HEI7

[51] Int. Cl.⁶ .................................... H01M 4/66
[52] U.S. Cl. .................. 429/212; 429/323; 429/246; 427/201; 427/247; 427/373
[58] Field of Search ...................... 427/201, 247, 427/373; 429/212, 217, 232, 246

[56] References Cited

U.S. PATENT DOCUMENTS

| | | | |
|---|---|---|---|
| 3,060,254 | 10/1962 | Urry | 429/217 |
| 3,884,721 | 5/1975 | Tucholski | 429/212 X |
| 4,048,406 | 9/1977 | Sandera et al. | 429/246 X |
| 5,262,255 | 11/1993 | Ito et al. | 429/217 |
| 5,474,861 | 12/1995 | Bito et al. | 429/232 X |
| 5,541,022 | 7/1996 | Mizumoto et al. | 429/232 X |

FOREIGN PATENT DOCUMENTS

| | | | |
|---|---|---|---|
| 63-13264 | 1/1988 | Japan | H01M 4/40 |
| 63-114057 | 5/1988 | Japan | H01M 4/02 |
| 5-47381 | 2/1993 | Japan | H01M 4/40 |
| 5-190171 | 7/1993 | Japan | H01M 4/02 |
| 5-234585 | 9/1993 | Japan | H01M 4/02 |

OTHER PUBLICATIONS

Journal of Applied Electrochemistry, vol. 22, No. 7, N. Kumagai et al., pp. 620–627, "Cycling behaviour of lithium–aluminium alloys formed on various aluminium substrates as negative electrodes in secondary lithium cells" Jul. 1992.

*Primary Examiner*—Stephen Kalafut
*Attorney, Agent, or Firm*—Fitzpatrick, Cella, Harper & Scinto

[57] ABSTRACT

A highly reliable rechargeable battery comprising an anode, a cathode, a separator positioned between said anode and said cathode, and an electrolyte or an electrolyte solution disposed so as to contact with said anode and said cathode, characterized in that said anode is provided with an anode active material-retaining body comprising (a) an electrically conductive material and (b) an insulating or semiconductor material having a property of allowing an ion dedicated for a battery reaction to pass through but not or substantially not allowing an anode active material deposited upon operating charging to pass through, and said anode active material-body having a number of pores distributed therein at a porosity rate of 10% or more.

87 Claims, 4 Drawing Sheets

ANODE WITH AN ANODE ACTIVE MATERIAL-RETAINING BODY HAVING A NUMBER OF PORES DISTRIBUTED THEREIN, A RECHARGEABLE BATTERY, PROVIDED WITH SAID ANODE, AND THE PROCESS FOR THE PRODUCTION OF SAID ANODE

BACKGROUND OF THE INVENTION

1. Field of the Invention

The present invention relates to an improved anode which can be desirably used as an anode in rechargeable batteries such as rechargeable lithium batteries and rechargeable zinc series batteries (these rechargeable batteries will be hereinafter referred to simply as rechargeable battery), said anode comprising a collector and an anode active material-retaining body disposed on said collector, said anode active material-retaining body comprising a layer comprised of a specific insulating or semiconductor material and an electrically conductive material distributed in said insulating or semiconductor material and which contains a number of pores spacedly distributed therein, said anode active material-retaining body having cushioning properties such that it is neither deformed nor cracked when repeatedly expanded or shrunk upon repeating the charging and discharging cycle.

The present invention also relates to a rechargeable battery provided with said anode which is always highly safe and stably exhibits an excellent battery performance while preventing the generation or growth of a dendrite (or a branched tree-like protrusion) of lithium or zinc upon the repetition of the charging and discharging cycle, and which posseses long cycle life (in other words, it has a prolonged charging and discharging cycle life).

The present invention further relates to a process for the production of said anode.

2. Related Background Art

In recent years, increasing levels of atmospheric $CO_2$ has been predicted to cause an increase in the earth's temperature, due to the greenhouse effect.

In the case of the steam-power generation, increasing amounts of a fossil fuels represented by coal or petroleum, are being consumed for power generation in order to comply with societal demand for increased power supply. Along with this, the amount of exhaust fumes from the steam-power generation plants has also been continuously increased while accordingly increases the amount of greenhouse gases released into the atmosphere. This results in an earth-warming phenomenon. In order to prevent said earth-warming phenomenon from further developing, prohibitions on newly established steam-power generation plants have been implemented in some countries.

Under circumstances, use of load leveling has been proposed in order to effectively utilize the power generator. Rechargeable batteries are installed in homes and a surplus power unused in the night, a so-called dump power, is stored in these rechargeable batteries. The power thus stored is supplied in the daytime when the power demand is increased, whereby the power generator is leveled in terms of the load therefor.

In recent years, electric vehicles have been developed which do not exhaust any air polluting substance and are of low impact to the environment. The electric vehicles expected to replace gasoline-fueled vehicles and diesel electric vehicles. For such an electric vehicle, there is an increased demand for developing a high-performance rechargeable battery with a high energy density which can be effectively used therein.

On the other hand, there is also an increased demand for developing a miniature, lightweight, high performance rechargeable battery usable as a power source for portable instruments such as small personal computers, word processors, video cameras, and pocket telephones.

Further, there is an increased demand for realizing a high performance rechargeable battery capable of attaining load leveling not only for a power generated by solar cells but also for a power generated by an aerogenerator or a wave activated power generator so that a dump power can be stored in the rechargeable battery and the power thus stored can be supplied depending upon demand.

There has been proposed various rocking chair type lithium ion rechargeable batteries in which a carbon material such as graphite, capable of intercalating lithium ions at an intercalation of its six-membered network is used as an anode material and a lithium intercalation compound capable of deintercalating said lithium ion from the intercalation in the battery reaction upon charging is used as a cathode material. Some of these types of batteries have been practically used. However, as in any of these lithium ion batteries, the theoretical amount of lithium which can be intercalated by the anodes is only an amount of ⅙ per carbon atom. If the amount of lithium intercalated by the anode is to be made greater than the theoretical amount, there will be the unavoidable problem that lithium is deposited in a dendritic state (that is, in the form of a dendrite) on the anode during the charging operation. This will result in causing internal-shorts between the anode and the cathode upon repeating the charging and discharging cycle, with reduced charging and discharging cycle life.

Therefore, using the prior art battery design, a desirable rechargeable battery having a electric capacity and energy density similar to those in a primary battery, in which a lithium metal is used as the anode, cannot be obtained.

Rechargeable lithium batteries in which a metallic lithium is used as the anode have been proposed. However, such rechargeable battery is not practically usable one because its charging and discharging cycle life is extremely short. Metallic lithium reacts with impurities such as water or an organic solvent contained in an electrolyte solution to form an insulating film, the formation of the insulating film leads to the generation of a dendrite during the charging operation, resulting in internal-shorts between the anode and cathode upon repeating the charging and discharging cycle. As a result, the charging and discharging cycle life of the rechargeable battery is extremely shortened.

Once the lithium dendrite is formed, the dendrite is liable to gradually grow upon the charging operation, resulting in internal-shorts between the anode and the cathode. When the anode is internally shorted with the cathode, the energy possessed by the battery is rapidly consumed at the internally shorted portion. This creates problems wherein the battery is heated or the solvent of the electrolyte is decomposed by virtue of heat to generate gas, resulting in an increase in the inner pressure of the battery. These problems result in damaging the rechargeable battery or/and shortening the lifetime of the battery.

Use of a lithium alloy such as lithium-aluminum alloy as the anode for a rechargeable lithium battery has been proposed as a way to suppress the reactivity of the lithium with water or use of an organic solvent contained in the electrolyte solution to prevent lithium dendrite formation. However, this is not practical because the lithium alloy is difficult to fabricate into a spiral form and therefore, it is difficult to produce a spiral-wound cylindrical rechargeable battery. Accordingly desirable charging and discharging cycle life or energy density for a rechargeable battery cannot be obtained using lithium-alloys as the anode.

Japanese Unexamined Patent Publication No. 13264/1988 (hereinafter referred to as document 1), No. 47381/1993 (hereinafter referred to as document 2) or No. 190171/1993 (hereinafter referred to as document 3) discloses a non-aqueous series rechargeable battery in which the anode is composed of a lithium alloy. Particularly, document 3 discloses a non-aqueous series battery directed to improving the cycle life and also in the cycle characteristics after having been stored. The anode is composed of a material comprising (i) an aluminum-manganese alloy added with a metal which is more electrochemically noble than aluminum such as vanadium, chromium, or titanium, and (ii) lithium as the anode active material, wherein the active site of said alloy with said lithium is increased to prevent localization of the reaction.

Further, Japanese Unexamined Patent Publication No. 114057/1988 (hereinafter referred to as document 4) discloses a non-aqueous series rechargeable battery directed to improving the charging and discharging characteristics. This anode of this battery is composed of a basic constituent comprising a sintered body of a mixture composed of (i) fibrous aluminum and fibrous metal incapable of being alloyed with lithium and (ii) a negative material comprising a lithium-aluminum alloy.

In addition, Japanese Unexamined Patent Publication No. 234585/1993 (hereinafter referred to as document 5) discloses a non-aqueous series rechargeable battery directed to minimizing the generation of a dendrite so that the charging efficiency is improved and the battery cycle life is prolonged. The anode is composed of a member made of lithium metal, having powdery metal (which hardly forms an intermetallic compound with said lithium metal) uniformly deposited on the surface thereof.

However, problems remain in each of the rechargeable batteries disclosed in the above documents 1 to 5. As the charging and discharging cycles are over a long period of time, the anode is repeatedly expanded and shrunk which results in depletion of the constituents or cracking, wherein the generation or growth of a dendrite cannot be sufficiently prevented. These rechargeable batteries eventually fail.

Other than the above-mentioned documents, *Journal of Applied Electrochemistry*, 22, 620–627 (1992) (hereinafter referred to as document 6) discloses a rechargeable lithium battery in which the anode is composed of an aluminum foil having a surface applied with etching treatment. However, the rechargeable lithium battery disclosed in the document 6 is also problematic. When the charging and discharging cycle is repeated under standard use conditions for the ordinary rechargeable battery, the aluminum foil is repeatedly expanded and shrunk, eventually cracking, resulting in a reduction in the current collecting performance, wherein the growth of a dendrite is liable to occur.

Hence, each of the rechargeable batteries disclosed in the documents 1 to 6 still present some problems which must be solved.

The above situation in the conventional rechargeable lithium batteries is similar in the conventional rechargeable zinc series batteries including nickel-zinc batteries, rechargeable zinc-oxygen (or zinc-air) batteries and rechargeable bromine-zinc batteries. That is, in any of these zinc series batteries, the foregoing problems relating to the occurrence of a dendrite in the rechargeable lithium batteries are liable to often occur and therefore, it is difficult to attain a high energy density and a prolonged cycle life.

Accordingly, there is an increased demand for an improved, highly reliable rechargeable battery which possesses high energy density (or charge energy density) and long charging and discharging cycle life.

SUMMARY OF THE INVENTION

A principal object of the present invention is to eliminate the foregoing problems found in the known rechargeable batteries and to provide a rechargeable battery with an improved anode which is free of such problems.

Another object of the present invention is to provide an improved anode for a rechargeable battery, said anode comprising a specific anode active material-retaining body, said anode demonstrating low internal resistance and low current loss and being free of the generation or growth of a dendrite. This anode provides a highly reliable, high performance rechargeable battery having a large electric capacity which possesses high energy density and long cycle life (that is, charging and discharging cycle).

A further object of the present invention is to provide an improved anode for a rechargeable battery, said anode comprising a specific anode material-retaining body having a number of pores spacedly distributed therein, said anode being capable of effectively depositing and retaining a large quantity of an anode active material therein upon operating the charging and having cushioning properties such that it is hardly deformed or cracked when expanded or shrunk upon repeating the charging and discharging cycle, said anode being free of the generation or growth of a dendrite, and said anode a highly reliable, high performance rechargeable battery having a large electric capacity high energy density and long cycle life.

A further object of the present invention is to provide an improved anode for a rechargeable battery, said anode comprising a collector and an anode active material-retaining body disposed on said collector, said anode active material-retaining body comprising a layer comprised of (a) an insulating material or a semiconductor material (these insulating material and semiconductor material will be collectively referred to as insulating or semiconductor material in the following) having a property of allowing an ion dedicated for the battery reaction, that is, an ion generated during battery charging or discharging, to pass through but not or substantially not allowing an anode active material deposited upon charging to pass through and (b) an electrically conductive material distributed in said insulating or semiconductor material (a) such that said electrically conductive material (b) is covered by, that is, distributed within, said insulating or semiconductor material (a), said layer containing a number of pores spacedly distributed therein, said pores capable of allowing an anode active material to be deposited and retained therein upon charging, said anode active material-retaining body having cushioning properties such that the body is hardly deformed or cracked when expanded or shrunk upon repeating the charging and discharging cycle and being free of the generation or growth of a dendrite, said anode possesses low internal resistance and current loss, and said anode provides a highly reliable, high performance rechargeable battery having a large electric capacity having high energy density and long cycle life.

A further object of the present invention is to provide a highly reliable, high performance rechargeable battery which is provided with the above described anode, which has a large electric capacity high energy density and long cycle life.

A further object of the present invention is to provide a highly reliable, high performance rechargeable battery which is provided with the above described anode, which has a large electric capacity and is free of the generation or growth of a dendrite even when the charging and discharging are alternately repeated over a long period of time, and which exhibits an excellent current collecting performance without being deteriorated.

A further object of the present invention is to provide a highly reliable, high performance rechargeable battery having a large electric capacity high energy density and long cycle life, said rechargeable battery comprising an anode (or a negative electrode), a separator, a cathode (or a positive electrode), an electrolyte or an electrolyte solution, and a housing, wherein said anode comprises a collector and an anode active material-retaining body disposed on said collector, said anode active material-retaining body comprising a layer comprised of (a) an insulating or semiconductor material having a property of allowing an ion dedicated for the battery reaction to pass through but not or substantially not allowing an anode active material deposited upon charging to pass through and (b) an electrically conductive material distributed in said insulating or semiconductor material (a) such that said electrically conductive material (b) is covered by said insulating or semiconductor material (a), said layer containing a number of pores spacedly distributed therein, said pores capable of allowing an anode active material to be deposited and retained therein upon operating the charging, said anode active material-retaining body having cushioning properties such that the body is hardly deformed or cracked when expanded or shrunk upon repeating the charging and discharging cycle, said anode being slight in terms of not only internal resistance but also current loss and being free of the generation or growth of a dendrite.

A further object of the present invention is to provide a process for the production of an anode for a rechargeable battery, said anode comprising a collector and an anode active material-retaining body disposed on said collector, said anode active material-retaining body comprising a layer comprised of (a) an insulating or semiconductor material having a property of allowing an ion dedicated for the battery reaction to pass through but not or substantially not allowing an anode active material deposited upon charging to pass through and (b) an electrically conductive material distributed in said insulating or semiconductor material (a) such that said electrically conductive material (b) is covered by said insulating or semiconductor material (a), said layer containing a number of pores spacedly distributed therein, said process comprising the steps of: providing a substrate capable of serving as said collector; providing a composition composed of (i) an electrically conductive material, (ii) an insulating or semiconductor material having a property of allowing an ion dedicated for the battery reaction to pass through but not or substantially not allowing an anode active material deposited upon operating the charging to pass through, and (iii) a material capable of forming said pores; applying said composition onto the surface of said substrate to form a coat on said substrate; and removing said material (iii) contained in said coat to form a number of pores spacedly distributed in said coat, whereby forming said anode active material-retaining body on said substrate.

A further object of the present invention is to provide a process for the production a rechargeable battery comprising an anode, a separator, a cathode, an electrolyte or an electrolyte solution, and a housing, wherein said anode comprises a collector and an anode active material-retaining body disposed on said collector, said anode active material-retaining body comprising a layer comprised of (a) an insulating or semiconductor material having a property of allowing an ion dedicated for the battery reaction to pass through but not or substantially not allowing an anode active material deposited upon charging to pass through and (b) an electrically conductive material distributed in said insulating or semiconductor material (a) such that said electrically conductive material (b) is covered by said insulating or semiconductor material (a), said layer containing a number of pores spacedly distributed therein, said process is characterized by including a step of forming said anode, said step comprising providing a substrate capable of serving as said collector; providing a composition composed of (i) an electrically conductive material, (ii) an insulating or semiconductor material having a property of allowing an ion dedicated for the battery reaction to pass through but not or substantially not allowing an anode active material deposited upon operating the charging to pass through, and (iii) a material capable of forming said pores; applying said composition onto the surface of said substrate to form a coat on said substrate; and removing said material (iii) contained in said coat to form a number of pores spacedly distributed in said coat, whereby forming said anode.

The term "rechargeable battery" in the present invention is meant to include a rechargeable lithium battery and a zinc series rechargeable battery. The zinc series battery herein is meant to include a rechargeable nickel-zinc battery, a rechargeable zinc-oxygen battery, and a rechargeable bromine-zinc battery.

DESCRIPTION OF THE INVENTION AND PREFERRED EMBODIMENTS

Figure 1:
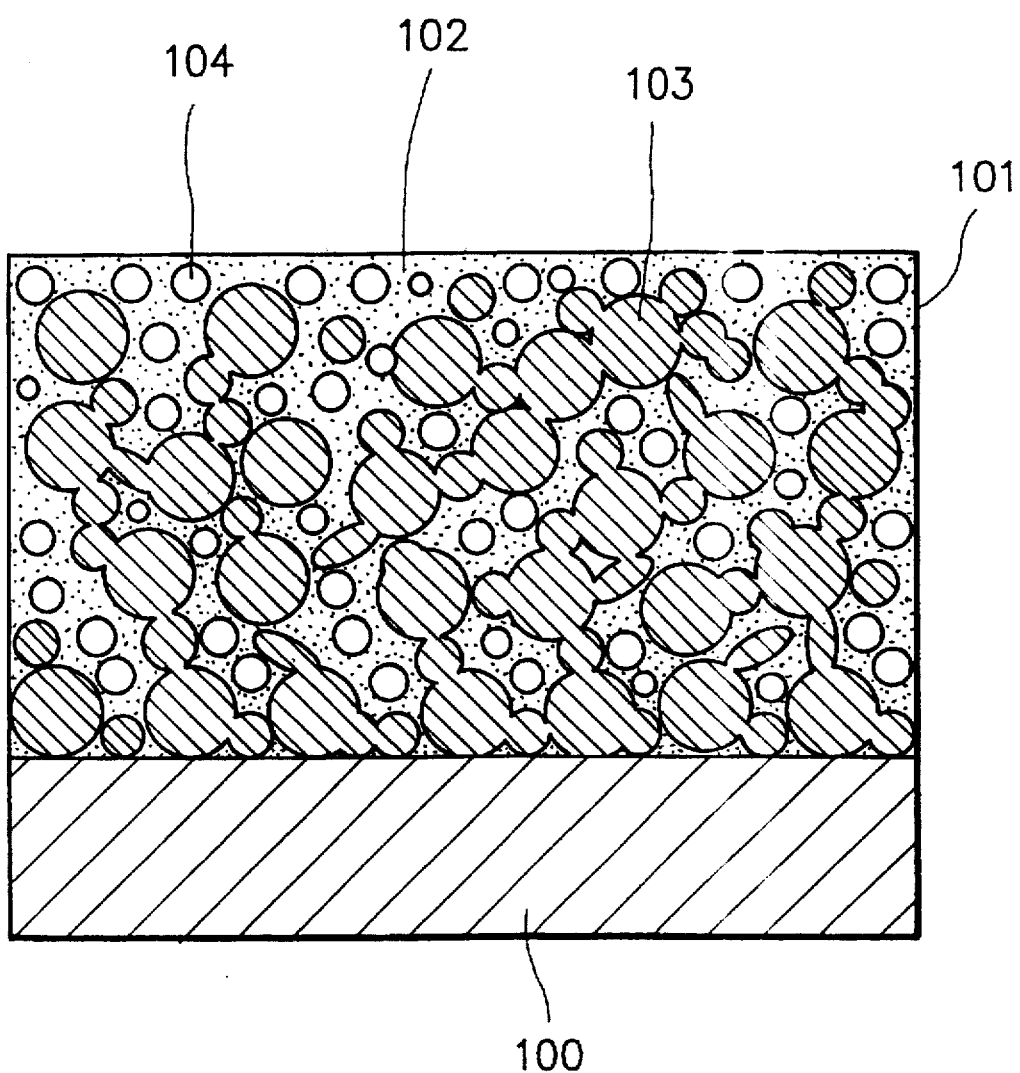
FIG. 1 is a schematic cross-sectional view illustrating an example of an anode for a rechargeable battery according to the present invention.

The present invention is designed to eliminate the foregoing problems found in the prior art and to attain the above described objectives.

The present inventors have made extensive studies through experiments, in order to attain a highly reliable, high performance rechargeable battery which is free of the problems found in the conventional rechargeable battery.

As a result, it was discovered that when the anode for a rechargeable battery is designed to have a specific anode active material-retaining body which is disposed to have an electrical contact with a collector, said anode active material-retaining body comprising a layer comprised of a specific insulating or semiconductor material having a property of allowing an ion dedicated for the battery reaction to pass through but not or substantially not allowing an anode active material such as lithium or zinc deposited upon charging to pass through and an electrically conductive material distributed in said insulating or semiconductor material such that said electrically conductive material is covered by said insulating or semiconductor material and which contains a number of pores spacedly distributed therein at a porosity rate of 10% or more, the use of the anode thus designed can attain a highly reliable, high performance rechargeable battery which is free of the problems found in the conventional rechargeable battery.

The present invention has been accomplished based on the above finding. A principal feature of the present invention lies in an improved anode for a rechargeable battery. A typical example of the anode according to the present invention comprises a collector and an anode active material-retaining body disposed on said collector, said anode active material-retaining body comprising a layer comprised of a specific insulating or semiconductor material having a property of allowing an ion dedicated for the battery reaction to pass through but not or substantially not allowing an anode active material such as lithium or zinc deposited upon charging to pass through and an electrically conductive material distributed in said insulating or semiconductor material such that said electrically conductive material is covered by said insulating or semiconductor material and that said electrically conductive material is electrically contacted with said collector and which contains a number of pores spacedly distributed in said layer at a porosity rate of 10% or more, said pores capable of allowing an anode active material to be deposited therein and to retain therein said anode active material therein upon charging. And the pores spacedly distributed in the anode active material-retaining body serves to provide cushioning properties to the anode such that it is hardly deformed or cracked even when it is repeatedly expanded or shrunk upon repeating the charging and discharging cycle.

The pore in the present invention is meant to have a void with a size which allows an ion dedicated for the battery reaction to pass through. The pore may be in an appropriate form as long as said condition is satisfied. For instance, it may be shaped in a round form, an elliptical form, a form comprising a modification of any of these forms.

The term "porosity rate" in the present invention means a volumetric capacity provided by all the pores against the total volume of the anode active material-retaining body excluding the collector.

In a preferred embodiment of the anode according to the present invention, said electrically conductive material is configured to have a plurality of islands distributed in said insulating or semiconductor material while said islands being connected with each other such that they are electrically contacted with the collector and wherein said pores are spacedly disposed in said insulating or semiconductor material or in the vicinity of said islands.

The anode thus constituted according to the present invention has an increased specific surface area. In the anode according to the present invention, an anode active material such as lithium or zinc which is deposited in each pore upon charging is substantially free of direct contact with an electrolyte. Because of this, the anode according to the present invention is free of the problems often found in the conventional rechargeable battery wherein the lines of electric force are centralized at a limited position of the anode thereof and an anode active material deposited is contacted and reacted with an impurity contained in an electrolyte, resulting in the generation or growth of a dendrite of lithium or zinc. Particularly, in the anode according to the present invention, a dendrite of lithium or zinc is effectively prevented from generating or if said dendrite should be generated, its growth is effectively prevented.

Further, as above described, the anode according to the present invention has pores in which an anode active material such as lithium or zinc is deposited and retained upon charging. And because of having the pores, the anode is structurally relaxed such that it is always maintained in a desirable state without being deformed or cracked even when it is expanded or shrunk upon the repetition of the charging and discharging cycle. Particularly, the anode is hardly cracked when expanded due to the deposition of said anode active material therein. Hence, the anode always exhibits a desirable performance as an anode of a rechargeable battery without being deteriorated even when the charging and discharging cycle is repeated over a long period of time.

Therefore, the use of the anode according to the present invention to provides a highly reliable, high performance rechargeable battery having high energy density and long cycle life (that is, charging and discharging cycle).

In the present invention, it is desired for the electrically conductive material contained in the anode active material-retaining body of the anode to be an electrically conductive material having a large specific surface area such as a powdery electrically conductive material or a fibrous electrically conductive material. By this, the current density (that is, the density of a current in the electrically conductive material) upon depositing an anode active material such as lithium or zinc is markedly decreased. It is known that the greater the current density, the higher the probability of growing the active material into a dendrite. The present invention is free of this problem. That is, the current density is markedly decreased as above described, and as a result, a dendrite of lithium or zinc is effectively prevented from generating or if said dendrite should be generated, it is effectively prevented from growing.

Further, in this case, the insulating or semiconductor material of the anode active material-retaining body is hardly deteriorated even when it is repeatedly expanded upon the repetition of the charging operation to cause the deposition of an anode active material such as lithium or zinc. This is due to a fact that the anode active material on the surface of the electrically conductive material is markedly thin because the electrically conductive material has a large specific area as above described. This situation maintains the anode in a desirable state without being deformed or cracked, resulting in providing a desirable rechargeable battery having a prolonged charging and discharging cycle.

In the present invention, even in the case where a carbon material such as graphite is used as the electrically conductive material, there is provided a desirable rechargeable lithium battery in which the generation or growth of a dendrite is effectively prevented and which has a desirably long charging and discharging cycle life. Even when the carbon material is intended to intercalate lithium in a greater amount than the previously described theoretical amount, the insulating or semiconductor material constituting the anode in the present invention suppresses lithium deposited to contact with the electrolyte solution. Hence, in a rechargeable battery provided with the anode according to the present invention, there can be attained a desirable energy density similar to that of the primary battery in which a lithium metal is used as the anode which is greater than the lithium ion battery in terms of electric capacity.

The advantages of the present invention are provided not only in the case of a rechargeable lithium battery but also in the case of a zinc series rechargeable battery such as a rechargeable nickel-zinc battery, rechargeable zinc-oxygen (or zinc-air) battery, or rechargeable bromine-zinc battery.

In the following, the present invention will be detailed while referring to FIG. 1 and FIG. 2.

FIG. 1 is a schematic cross-sectional view illustrating a typical example of the anode for a rechargeable battery according to the present invention.

Figure 2:
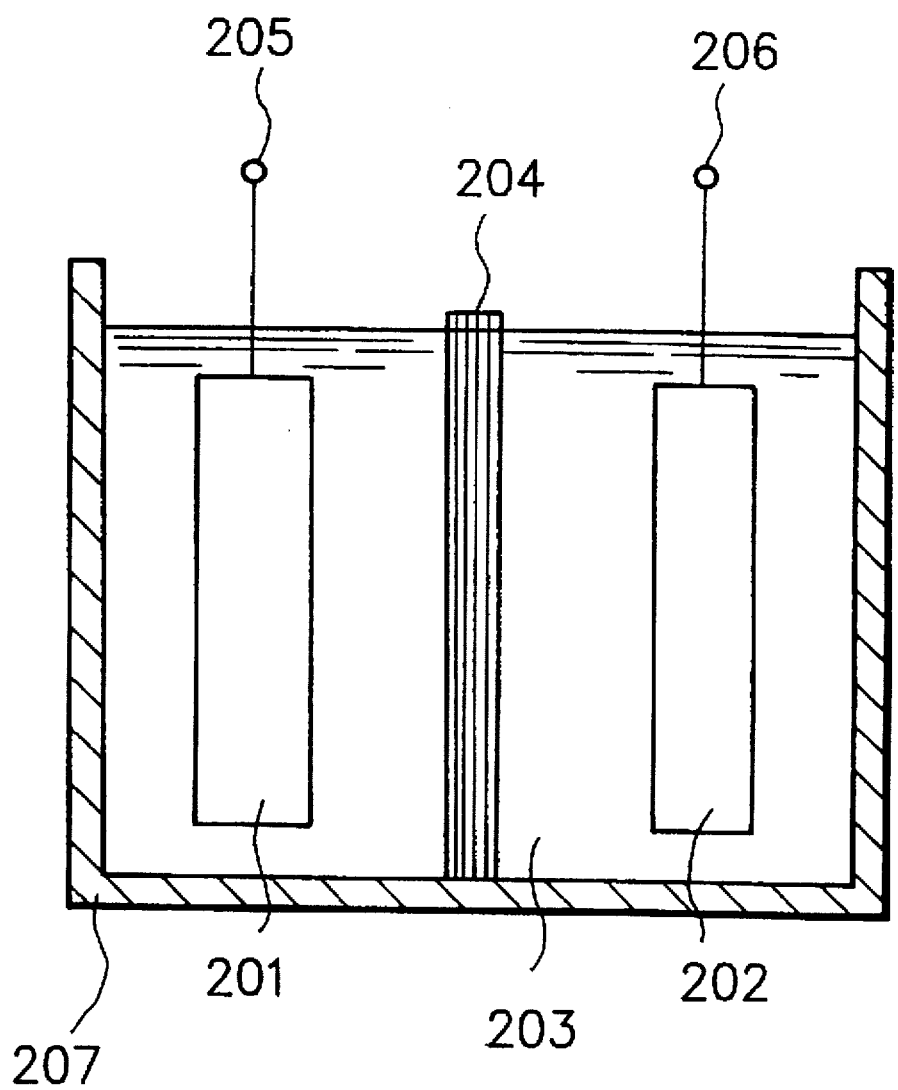
FIG. 2 is a schematic diagram illustrating the constitution of an example of a rechargeable battery according to the present invention.

FIG. 2 is a schematic diagram illustrating the constitution of an example of a rechargeable battery according to the present invention, in which the foregoing anode according to the present invention, a cathode, a separator and an electrolyte (or an electrolyte solution) are combined.

In FIG. 1, reference numeral 100 indicates an anode collector, reference numeral 101 a layer as the foregoing anode active material-retaining body, reference numeral 102 an insulating or semiconductor material having a property of allowing an ion dedicated for the battery reaction to pass through but not or substantially not allowing an anode active material such as lithium or zinc deposited upon operating the charging to pass through, reference numeral 103 an electrically conductive material, and reference numeral 104 a pore.

In the anode shown in FIG. 1, the layer 101 is disposed on the anode collector 100 and the layer 101 is situated so as to oppose to a cathode (not shown) through an electrolyte (or an electrolyte solution) (not shown).

As apparent from FIG. 1, the layer 101 as the anode active material-retaining body is comprised of the electrically conductive material 103 having a plurality of islands distributed in the layer 101 while being covered by the insulating or semiconductor material 102 and wherein said islands are connected with each other and they are electrically contacted with the collector 100. The layer 101 contains a number of pores 104 which are spacedly distributed in the insulating or semiconductor material 102 and in the vicinity of said islands of the electrically conductive material. Each of the pores 104 has a space circumscribed by the insulating or semiconductor material.

In FIG. 2, reference numeral 201 indicates an anode having such confuguration as shown in FIG. 1, reference numeral 202 a cathode, reference numeral 203 an electrolyte (or an electrolyte solution), reference numeral 204 a separator, reference numeral 205 an anode terminal, reference numeral 206 a cathode terminal, and reference numeral 207 a housing. As apparent from FIG. 2, the anode 201 and the cathode 202 are arranged so as to contact with the electrolyte 203 and oppose to each other. And the separator 204 is disposed between the anode 201 and the cathode 202 in order to prevent the occurrence of internal-shorts between the two electrodes.

In the following, description will be made of each constituent of a rechargeable battery according to the present invention.

ANODE

The anode disposed in a rechargeable battery according to the present invention comprises a collector and an anode active material-retaining body disposed on said collector, said anode active material-retaining body comprising a layer comprised of (a) a specific insulating or semiconductor material having a property of allowing an ion dedicated for the battery reaction to pass through but not or substantially not allowing an anode active material such as lithium or zinc deposited upon charging to pass through and (b) an electrically conductive material distributed in said insulating or semiconductor material (a) such said electrically conductive material (b) is covered by said insulating or semiconductor material (b) and which contains a number of pores spacedly distributed in said insulating or semiconductor material (a) at a porosity rate of 10% or more, said pores capable of allowing an anode active material such as lithium or zinc to deposit and retain therein upon charging. Said pores also serves to impart cushioning properties to the anode active material-retaining body such that it is hardly deformed or cracked when it is repeatedly expanded and shrunk upon repeating the charging and discharging cycle.

In a preferred embodiment of the anode, said electrically conductive material is configured to have a plurality of islands distributed in the insulating or semiconductor material contained in the layer while being connected with each other such that they are electrically contacted with the collector and wherein said pores are spacedly distributed in the insulting or semiconductor material and some of them may be situated in the vicinity of the islands of the electrically conductive material. And each of the pores has a space circumscribed by the insulating or semiconductor material.

The anode thus configured may be obtained in any of the following methods (1) and (2).

Method (1):

There are provided (a) an electrically conductive material, (b) an insulating or semiconductor material having a property of allowing an ion dedicated for the battery reaction to pass through but not or substantially not allowing an anode active material such as lithium or zinc deposited upon charging to pass through, and (c) a material capable of forming the foregoing pores which can be easily removed by way of evaporation or by way of elution (this material will be hereinafter referred to as pore-forming material).

Then, these three materials (a), (b) and (c) are mixed to obtained a coating composition. As for the amount of the pore-forming material (c) to be used, it is determined based a specific volume for the pore-forming material (c) among the three materials which can cause the formation of a number of pores at a desired porosity rate. The specific volume can be obtained based on the specific gravities of the three materials. If necessary, an appropriate solvent may be incorporated into the coating composition.

The coating composition thus obtained is applied onto the surface of a substrate as an anode collector to form a layer on the anode collector. The layer thus formed on the collector is subjected to drying or polymerization. Thereafter, the pore-forming material contained in the layer is removed by way of evaporation or by way of elution to thereby form a number of pores spacedly distributed in the layer at a desired porosity rate. Thus, there is obtained an anode according to the present invention.

In the above, the application of the coating composition onto the surface of the collector may be conducted by means of a conventional coating manner such as dip coating, spray coating, coating with a coater, screen process printing, or roll coating.

The coating composition to be applied onto the surface of the collector may contains a cross-linking agent or a polymerization initiator. In this case, the layer formed by applying the coating composition onto the surface of the collector is subjected to heat treatment or irradiation of ultraviolet rays, electron beam, or radiant rays to cause cross-linking reaction or polymerization reaction in the layer.

As above described, the coating composition to be applied onto the surface of the collector may contain an appropriate solvent in order to adjust the viscosity thereof. As for the solvent used, in the case of obtaining a rechargeable lithium battery, it is desired to be sufficiently dehydrated prior to incorporating into the coating composition. The dehydration of the solvent may be conducted by using activated alumina, molecular sieve, phosphorous pentoxide, or calcium chloride. Other than this, the dehydration of the solvent may be conducted by way of distillation in an atmosphere composed of an inert gas and in the presence of an alkali metal depending upon the kind of the solvent, wherein not only water but also impurities contained in the solvent can be removed.

Methods (ii):

There is provided an electrolyte solution containing a powdery electrically conductive material and a monomer, oligomer or polymer capable of being an insulating material dispersed therein. Into the electrolyte solution, an appropriate ionized-pore forming material which can be easily removed at a later stage is incorporated. A substrate as a collector is immersed in the electrolyte solution, and a counter electrode is disposed in the electrolyte solution. Then, said electrically conductive material and an insulating material composed of said monomer, oligomer or polymer and the ionized pore-forming material are deposited on the surface of the collector by way of the electrodeposition process by impressing a desired electric field between the substrate (the collector) and the counter electrode. The ionized pore-forming material can include metal salts which can be deposited by the electrodeposition process and polymers ionized by an ionic surface active agent. As for said ionized polymers as the pore-forming material, it is necessary to selectively use them so that only the ionized polymer used as the pore-forming material can be removed without removing the foregoing insulating material.

Of the above described manners (1) and (2), in the case of producing a rechargeable lithium battery, the manner (1) is the most desirable because lithium is liable to readily react with water and in view of easiness in the production process and also in view of easiness in the provision and handling of the constituent materials.

Now, the anode for a rechargeable battery according to the present invention contains an anode active material such as lithium or zinc upon operating the charging. As for the introduction of said anode active material into the anode, it can be conducted, for example, by a manner of electrochemically introducing an anode active material from the cathode into the anode by charging the rechargeable battery or another manner of mixing an electrically conductive material and an anode active material upon forming the anode to thereby introduce the anode active material into the anode.

Description will be made of the pores formed in the anode active material-retaining body of the anode according to the present invention.

As previously described, the pores spacedly distributed in the layer as the anode active material-retaining body in which the electrically conductive material is distributed while being covered by the insulating or semiconductor material, such that they are situated within the insulating or semiconductor material and sometimes also in the vicinity of the electrically conductive material serve to allow an anode active material to deposit and retain therein upon charging. The pores also serve to structurally relax the anode active material-retaining body disposed on the collector so that it is hardly deformed or cracked when it is expanded or shrunk when the repetition of the charging and discharging cycle. Thus, the anode always exhibits a desirable anode performance without being deteriorated even upon the charging and discharging cycle is continuously repeated over a long period of time. In addition, an electrolyte solution for a rechargeable battery is readily permeated into each pore of the anode comprising the active material body disposed on the collector in the present invention, to thereby effectively diffuse and ion in the anode. This results in decreasing the impedance of a rechargeable battery.

The pores in the present invention may be formed desirably by the foregoing method (1). Particularly, for instance, they may be formed by providing a given coating composition composed of the foregoing insulating or semiconductor material, an appropriate electrically conductive material and an appropriate pore-forming material capable of being readily eluted (this pore-forming material will be hereinafter referred to as "elutable pore-forming material") in a predetermined amount capable of attaining a desired porosity rate, applying said coating composition onto the surface of a substrate as an anode collector to form a coat on the substrate, and removing the pore-forming material contained in the coat by eluting If necessary, the starting coating composition may contain an appropriate solvent in order to adjust the viscosity thereof.

In this case, as the above pore-forming material, it is possible to use other pore-forming material which vaporizes, decomposes or foams at a relatively low temperature.

The coat containing such pore-forming material is subjected to heat treatment to remove said pore-forming material, whereby a number of pores can be formed in the coat on the substrate.

The foregoing elutable pore-forming material usable in the present invention can include powdery electrolytes usable in the preparation of an electrolyte solution for a rechargeable battery, organic solvents, powdery metallic materials, and polymer microbeads. Other than these, it is possible to use other materials which can be heat-decomposed such as sodium carbonate.

In the case where the powdery electrolyte is used as the elutable pore-forming material, if the powdery electrolyte is not completely removed, the residual electrolyte does not exert a negative influence, in terms of the quality of a rechargeable battery obtained, because it is the same as an electrolyte used in an electrolyte solution for the rechargeable battery. Therefore, there can be attained a high quality anode. In the case of using such powdery electrolyte, there is an advantage that it is not always necessary to remove the powdery electrolyte. That is, when the anode obtained without having removed the powdery electrolyte is introduced into a rechargeable battery, adding a solvent used in the preparation of an electrolyte solution for the rechargeable battery elutes the powdery electrolyte into the solvent to provide an electrolyte solution. Hence the step for the preparation of an electrolyte solution can be eliminated, resulting in simplifying the process for producing a rechargeable battery.

In the case where a metallic material is used as the elutable pore-forming material, the metallic material contained in the coat can be effectively removed by subjecting the coat containing the metallic material to etching treatment using an etching solution of an acid or alkali to elute the metallic material into the etching solution, followed by removing the etching solution containing the metallic material, whereby a number of pores are formed in the coat. However, the etching solution used in this case must not elute the electrically conductive material.

In the case where a liquid material having a relatively high boiling point is used as the elutable pore-forming material, the liquid material contained in the coat can be effectively removed by subjecting the coat containing the liquid material to heat treatment or treatment under reduced pressure to evaporate the liquid material or by subjecting said coat to freeze-drying to thereby remove the liquid material or by immersing said coat in a solvent having a low boiling point with which the liquid material can be uniformly mixed to thereby remove said liquid material, whereby a number of pores are formed in the coat.

The porosity rate (which indicates the volumetric capacity) for the pores spacedly distributed in the layer as the anode active material-retaining body can be measured using a mercury porosimeter, a specific surface area analyzer, or an electron microscope. Other than this, the porosity rate can be determined based on the volume of the elutable pore-forming material used.

The anode according to the present invention has a specific structure provided by the pores. Particularly, the anode has cushioning properties such that it is hardly deformed or cracked when it is repeatedly expanded and shrunk upon repeating the charging and discharging cycle. This provides a pronounced advantage in that a dendrite of lithium or zinc is effectively prevented from being generated upon charging, or if said dendrite should be generated, it is effectively prevented from growing.

A rechargeable battery provided with the anode according to the present invention exhibits a markedly improved charging and discharging performance and has a markedly prolonged charging and discharging cycle life.

When the porosity rate for the pores spacedly distributed in the anode active material-retaining body, is made to be excessively large, the amount of the electrically conductive material in the anode active material-retaining body is accordingly decreased to increase the resistance of the anode, resulting in an increased current loss. In addition to this, a desirable structural strength for the anode active material-retaining body is not attained.

The optimum porosity rate is somewhat different depending upon the related factors such as the electrical resistivity of the electrically conductive material, the distribution state of the electrically conductive material, the distribution magnitude of the pores, the thickness of the anode active material-retaining body, and the like. However, in general, it is desired to be preferably in the range of 10% to 90% or more preferably in the range of 20% to 80%.

A description of the pore size and the distribution state of the pores in the anode active material-retaining body follows.

As previously described, the insulating or semiconductor material which covers the electrically conductive material in the anode active material-retaining body disposed on the collector is required to have a molecular structure capable of allowing an ion dedicated for the battery reaction to pass through but incapable or substantially incapable of allowing an anode active material such as lithium or zinc deposited upon charging to pass through. The insulating or semiconductor material may have minute gaps or micropores in view of the molecular structure.

The minimum size of the pores spacedly distributed in the anode active material-retaining body of the present invention should be determined based on a size for an ion dedicated for the battery reaction which is capable of passing through the insulating or semiconductor material. Particularly, their minimum size is required to be greater than the diameter of the ion dedicated for the battery reaction. And as for their maximum size, it is desired to be smaller than the size of a crystal grain of an anode active material deposited upon charging.

A description of the electrically conductive material used in the anode according to the present invention follows.

The electrically conductive material used in the anode active material-retaining body of the anode according to the present invention serves to accept an ion dedicated for the battery reaction.

The electrically conductive material useful in the present invention can include metallic materials of Ni, Ti, Cu, Al, Pt, Pd, Au, Zn, Li, or the like, alloy materials of these metals such as stainless steel, carbon, graphite, and mixtures of two or more of these materials.

In the case where the anode is used in a rechargeable lithium battery, the electrically conductive material is preferably a member selected from the group consisting of metallic materials of Ni, Ti, Cu, Al, or Pt, alloy materials of these metals, stainless steel, carbon, and graphite.

In the case where the anode is used in a rechargeable zinc series battery, the electrically conductive material is preferably a member selected from the group consisting of metallic materials of Zn, Ni, Ti, Cu, or Pt, alloy materials of these metals, and stainless steel.

As for the electrically conductive material in any case, it is preferably in a powder-like form, a fibrous form, or a form comprising of a combination of these two forms. The powder-like form is meant to include a round form, a flake-like form, a chain-like form, a sponge-like form, and a combination of two or more these forms. In the case where the electrically conductive material is configured to two or more forms selected from the round form, flake-like form, chain-like form, and sponge-like form in combination, a desirable packing density for the electrically conductive material contained in the anode active material-retaining body of the anode can be attained, resulting in advantageously decreasing the internal resistance of the anode and also desirably reducing the current loss.

In a preferred embodiment, the electrically conductive material used in the anode according to the present comprises invention comprises an electrically conductive material in a powder-like form or a fibrous form which has a specific surface area preferably of 1 $m^2/g$ or more or more preferably of 5 $m^2/g$ or more. In this case, a remarkably large specific surface area for the resulting anode can be attained, and there are provided pronounced advantages such that the current density of the surface of the electrically conductive material is markedly decreased resulting in not only preventing side reactions from occurring upon the battery reaction but also preventing the generation or growth of a dendrite of lithium or zinc.

A description will be made of the insulating or semiconductor material used in the anode according to the present invention follows.

The insulating or semiconductor material used in the anode active material-retaining body of the anode according to the present invention representatively plays the following three roles; (i) to distribute the electrically conductive materials such that they are connected with each other, (ii) to bond electrically conductive materials to an anode collector, and (iii) to cover electrically conductive materials so that anode active materials deposited on their surfaces are not directly contacted with an electrolyte solution. Of these roles, the above role (iii) is the most important.

Now, in order for the insulating or semiconductor material to sufficiently play the role (iii), the insulating or semiconductor material to must have a molecular structure with gaps or/and micropores in view of the molecular structure, having a size greater than the diameter of an ion dedicated for the battery reaction, and In addition, the insulating or semiconductor material preferably has a property capable of allowing an ion dedicated for the battery reaction to pass through but not or substantially not capable of allowing an anode active material such as lithium or zinc deposited upon charging to pass through.

Lithium ion or zinc ion has a diameter of about 0.15 nm. Therefore, the insulating or semiconductor material is required to have gaps or micropores in view of the molecular structure, having a size greater than the diameter of lithium ion or zinc ion so that lithium ion or zinc ion can pass through. In order to prevent a crystal of an anode active material such as lithium or zinc deposited upon operating the charging from growing into a dendrite of lithium or zinc, the insulating or semiconductor material preferably has a size distribution for the gaps or micropores that has a peak of at a region of less than 100 nm. Particularly, as for said size distribution, it is desired to be preferably in the range of 0.15 nm to 100 nm or more preferably in the range of 0.2 nm to 10 nm.

In view of the above, the insulating or semiconductor material used in the anode active material-retaining body of the anode according to the present invention preferably has a size distribution for the foregoing gaps or micropores, having a peak at a region in the range of 0.15 nm to 100 nm. Particularly, said size distribution desirably has a peak preferably in the range of 0.15 nm to 20 nm or more preferably in the range of 0.2 nm to 10 nm.

The above size distribution can be obtained in a manner of obtaining data by means of a conventional specific surface area analyzer and analyzing said data by the BJH (Barrett-Joyner-Halenda) method or H-K (Horvath-Kawazoe) method.

The insulating or semiconductor material used in the present invention also should be stable, such that it is not reactive with and insoluble to an electrolyte or electrolyte solution for a rechargeable battery. The insulating or semiconductor material must exhibit a sufficient adhesion so that the electrically conductive material can be satisfactorily bonded to the collector. In addition, the insulating or semiconductor material must enable the ready formation of the foregoing pores therein. Further, the insulating or semiconductor material must a sufficient resistance to the expansion and shrinkage caused upon repeating the charging and discharging cycle.

The insulating or semiconductor material used in the present invention is preferably a material that can take up lithium ion or zinc ion to supply such ion in the vicinity of the electrically conductive material by way of relatively weak interaction between an electron and cation. The electron donating element can include elements having an unpaired electron, paired electron, or d-electron. The electron donating group can include molecules having a π-electron. Specifically, the electron donating element may be one or more elements selected from the group consisting of oxygen (O), nitrogen (N), and sulfur (S).

A description will be made of the insulating or semiconductor material which can satisfy the foregoing conditions and is usable in the present invention follows.

The insulating or semiconductor material usable in the present invention can include (A) high molecular materials having as a molecular structure a large ring structure such as a cyclic polyether as a backbone or as an side chain (these high molecular materials will be hereinafter referred to as "large ring structure-bearing high molecular material"), (B) high molecular materials having an ether bond structure, ester bond structure, or aromatic ring as a backbone or as a side chain (these high molecular materials will be hereinafter referred to as "aromatic ring structure-bearing high molecular material"), (C) fluororesins having a carbon-fluorine bond, and (D) carbon-metal resins such as silicone resins having a carbon-metal bond. Other than these, there can be mentioned titanium resins, polyphosphazenes, glassy metal oxides, glassy nitrides, glassy carbonates, and glassy halides. Further, cellulose, polyvinyl alcohol, polyethylene glycol, polyethylene oxide, poly(2-methyl-2-oxazoline), and polyaminoic acids having an alpha-helical structure are also usable as the insulating or semiconductor material.

Of the materials mentioned in the above, the large ring structure-bearing high molecular material (A) and the aromatic ring structure-bearing high molecular material (B) are the most appropriate. When the anode is used for a rechargeable lithium battery having a non-aqueous electrolyte solution, it is desired that these materials (A) and (B) are crosslinked. Alternatively, the fluororesin (C) may be additionally used in addition to the material (A) or (B). Further, any of the high molecular materials (A) and (B) may be combined with an appropriate inorganic material such as inorganic oxides into a composite in order to attain an improved physical strength.

As for the high molecular materials (A) and (B), any commercially available high molecular materials belonging to the large ring-bearing high molecular material (A) or the aromatic ring-bearing high molecular material (B) can be used.

The high molecular materials (A) and (B) may be obtained, for example, by a manner of polymerizing monomers having a molecular structure with a large ring, ether bond, ester bond, carbonyl group, or aromatic ring therein. In this case, other appropriate monomers may be additionally subjected to the polymerization. Other than this, the high molecular materials (A) and (B) may be obtained, for example, by a manner of introducing a monomer having a molecular structure with a large ring, ether bond, ester bond, carbonyl group, or aromatic ring therein into an appropriate high molecular material by way of a crosslinking reaction.

As the above polymerization process, there can be employed an appropriate polymerization process capable of providing such relevant high molecular material through the polymerization of the foregoing monomer. Specifically, the polymerization process employable in the present invention can include condensation polymerization process, radical polymerization process, cationic polymerization process, anionic polymerization process, polymerization process using radiant rays, electron beam, or ultraviolet rays, and electro-polymerization process.

The radical polymerization process is conducted using a polymerization initiator such as azobisisobutyronitrile (AIBN), benzoylperoxide (BPO), or t-butylhydroperoxide.

The cationic polymerization is conducted using a polymerization initiator such as $H_2SO_4$, $H_3PO_4$, $HClO_4$, $CCl_3CO_2H$, or a Friedel-Crafts catalyst such as $BF_3$, $ACl_3$, $TiCl_4$, or $SnCl_4$.

The anionic polymerization process is conducted using a polymerization initiator selected from the group consisting of alkali metal compounds and organometal compounds.

The production of the large ring structure-bearing high molecular material (A) or the aromatic ring structure-bearing high molecular material (B) by the electro-polymerization process may be conducted, for example, in the following manner. That is, a monomer having a molecular structure with a large ring, ether bond, ester bond, carbonyl group, or aromatic ring therein is dissolved in an electrolyte solution for the electro-polymerization, and a desired electric field is applied between a substrate (that is, an anode collector) which is placed in said electrolyte solution and a counter electrode, which is also placed in said electrolyte solution to thereby polymerize the monomer. A large ring structure-bearing high molecular material or an aromatic ring structure-bearing high molecular material is thus forming on the substrate. The electrolyte solution herein comprises an appropriate electrolyte dissolved in a solvent.

The solvent can include acetonitrile, benzonitrile, propylene carbonate, dimethylformamide, tetrahydrofuran, nitrobenzene, dichloroethane, diethoxyethane, chlorobenzene, γ-butyrolactone, dioxolane, and mixtures of two or more of these compounds.

The solvent is preferably dehydrated prior the use thereof, using an activated alumina, molecular sieve, phosphorous pentoxide, or calcium chloride. Other than this, the dehydration of the solvent may be accomplished way of distillation in an atmosphere composed of an inert gas and in the presence of an alkali metal, depending upon the kind of the solvent, wherein not only water but also impurities contained in the solvent can be removed.

The electrolyte (that is, the supporting electrolyte) usable in the electro-polymerization can include inorganic acids such as $H_2SO_4$, HCl, and $HNO_3$; univalent metal ions such as $Li^+$, $K^+$, $Na^+$, $Rb^+$, and $Ag^+$; tetraalkylammonium ions such as $TBA^+$ (tetrabutylammonium ion) and $TEA^+$ (tetraethylammonium ion); salts comprised of Lewis acid ions such as $BF_4^-$, $PF_6^-$, $AsF_6^-$, and $ClO_4^-$; and mixtures of two or more of these salts. Any of these salts are preferably used after purification by way of recrystallization, or after heat treatment under reduced pressure, or after removal of water and oxygen.

As above described, any of the large ring structure-bearing high molecular material (A) and the aromatic ring structure-bearing high molecular material (B) may be crosslinked by way of crosslinking reaction. A crosslinked large ring structure-bearing high molecular material or a crosslinked aromatic ring structure-bearing high molecular material may be formed by (i) a manner of adding a crosslinking agent upon conducting any of the foregoing polymerization processes wherein the polymerization reaction and crosslinking reaction are simultaneously conducted, (ii) a manner of adding a crosslinking agent and if necessary, also a reaction accelerator to the large ring structure-bearing high molecular material (A) or the aromatic ring structure-bearing high molecular material (B) to obtain a mixture and subjecting the mixture to crosslinking reaction, for instance, by way of heat treatment, or (iii) a manner of subjecting said mixture in the manner (ii) to irradiation of radiant rays, electron beam, or ultraviolet rays to thereby engage the mixture in crosslinking reaction.

The above crosslinking agent can include isocyanate, polyisocyanate prepolymer, blocked isocyanate, organic peroxides, polyamine, oximes, nitroso compounds, sulfur, sulfur compounds, selenium, magnesium oxide, lead oxide, and zinc oxide. Specific examples of said organic peroxides are di-cumyl-peroxide; 2,5-dimethyl-2,5 di-(t-butylperoxy) hexane; 1,3-bis-(t-butyl-peroxy-isopropyl)benzene; 1,1-bis-(t-butyl-peroxy)-3,3,5-trimethyl-cyclohexane; n-butyl-4,4-bis-(t-butylperoxy)valerate; 2,2-bis-(t-butyl-peroxy)butane; t-butyl-peroxy-benzene; and vinyl-tris-(t-butyl-peroxy) silane.

The above reaction accelerator can include guanidine series reaction accelerators, aldehyde-amine series reaction accelerators, sulfenamide series reaction accelerators, thiourea series reaction accelerators, thiuram series reaction accelerators, dithiocarbamate series reaction accelerators, and zantate series reaction accelerators.

As above described, the high molecular materials (A) and (B) may be obtained by a manner of introducing a monomer having a molecular structure with a large ring, ether bond, ester bond, carbonyl group, or aromatic ring therein into an appropriate high molecular material by way of crosslinking reaction. Said appropriate high molecular material can include high molecular materials having a carboxyl group, amino group, hydroxyl group, vinyl group or diene group in their side chain.

A description of the large ring structure-bearing high molecular material (A) follows.

The large ring structure-bearing high molecular material (A) is based on a macrocycle (that is, a large ring compound) having a hetero-atom comprising at least one kind of atom selected from the group consisting of oxygen, nitrogen, sulfur and phosphorous and which has a large ring molecular structure with a size greater than the diameter of an ion dedicated for the battery reaction.

Such macrocycle can include cyclic polyethers (or crown ethers in the narrow sense) having a hetero-atom comprising oxygen; cyclic polyamines having a hetero-atom comprising nitrogen; cyclic polythiaethers having a hetero-atom comprising sulfur; cyclic azacrown ethers having hetero-atoms comprising oxygen and nitrogen; cyclic azathiacrown ethers having hetero-atoms comprising oxygen, nitrogen, and sulfur; and heterocyclic cryptands. Other than these, there can be mentioned cyclame, nonactin, varinomycin, silacrown (silicon atom-bearing crown ether), cyclodextrin, cyclophane, calixarene, phthalocyanine, and porphyrin.

In the case where a macrocycle (a large ring compound) having a terminal group comprising a carboxyl group, amino group or hydroxyl group is subjected to the condensation polymerization, when the reaction is between the carboxyl group and the amino group, there is formed a polyamide. In this condensation polymerization, when the reaction is between the carboxyl group and the hydroxyl group, there is formed a polyester. In the case where a macrocycle (a large ring compound) having a terminal group comprising a vinyl group or diene group is subjected to the radical polymerization, cationic polymerization, or anionic polymerization, there is formed an addition polymer.

In the case of a macrocycle (a large ring compound) having an aromatic ring, its polymerization can be conducted by way of dehydrogenation reaction using the foregoing Friedel-Crafts catalyst and an oxidant in combination.

As above described, the foregoing high molecular material (A) can be obtained by any of the foregoing polymerization processes wherein the same relevant macrocycle derivative is subjected to polymerization. Other than this, the high molecular material (A) may be a high molecular material obtained by copolymerizing two or more different relevant macrocycle derivatives or by copolymerizing a relevant macrocycle derivative and an appropriate monomer. Alternatively, the high molecular material (A) may be a high molecular material obtained by introducing a relevant macrocycle derivative into an appropriate polymer by way of substitution reaction.

Specific examples of the foregoing macrocycle monomer used in any of the foregoing polymerization processes excluding the electrolytic polymerization process are (+)-18-crown-6-tetracarboxylic acid (crown ether); 1,5,9,13,17, 21-hexathiacyclotetracosane-3,11,19-triol; 1,5,9,13,-tetrathiacyclohexadecane-3,11-diol; 1-aza-12-crown-4; 1-aza-15-crown-5; 1-aza-18-crown-6; 1,4,10,13- tetraoxa-7, 16-diazacyclooctadecane; 1,4,10-trioxa-7,13-diazacyclopentadecane; and 6,8-dioxabicyclo[3.2.1]octane-7on. Other than these, dibenzocrown ethers can be also mentioned.

Specific examples of the macrocycle monomer usable in the electro-polymerization are benzo-15-crown-5 (crown ether); benzo-18-crown-6 (crown ether); N-phenylaza-15-crown-5 (crown ether); dibenzo-18-crown-6 (crown eter); dibenzopyridino-18-crown-6 (crown ether); dibenzo-24-crown-8 (crown ether); 1,13-bis(8-quinolyl)-1,4,7,10,13-pentaoxatridecane; 5,6-benzo-4,7,13,16,21,24-hexaoxa-1; 10-diazabicyclo[8.8.8]-hexacosane; 5,6-14,15-dibenzo-4,7, 13,16,21,24-hexaoxa-1; 10-diazabicyclo[8.8.8]-hexacosane; bis[(benzo-15-crown-5-)-15-ylmethyl]pimelate; dibenzo-30-crown-10 (crown ether); N,N'-dibenzyl-1,4,10,13-tetraoxa-7; 16-diazacyclooctadecane; dilithiumphtalocyanine; and 4'-nitrobenzo-15-crown-5,3,6,9,14-tetrathiabicyclo[9.2.1]tetradeca-11,13-diene.

Description will be made of the aromatic ring structure-bearing high molecular material (B).

The aromatic ring structure-bearing high molecular material (B) is based one or more derivatives of an aromatic ring-bearing compound such as such as naphthalene, anthracene, phenanthrene, naphthacene, pyrene, pyridine, triphenylene, perylene, picene, benzopyrene, coronene, and ovalene.

The aromatic ring structure-bearing high molecular material (B) can be obtained by way of polymerization of a vinyl derivative monomer of such aromatic ring-bearing compound or an acetylene derivative monomer of such aromatic ring-bearing compound, or by way of copolymerization of a carboxyl group-bearing derivative monomer of such aromatic ring-bearing compound and a diamine group-bearing derivative monomer of such aromatic ring-bearing compound or a carboxyl group-bearing derivative monomer of such aromatic ring-bearing compound and a glycol group-bearing derivative monomer of such aromatic ring-bearing compound.

The polymerization of the vinyl derivative monomer may be conducted by the foregoing radical polymerization process or ionic polymerization process. The polymerization of the acetylene derivative monomer may be conducted by the foregoing polymerization process using a catalyst comprising molybdenum or tungsten. The copolymerization between the carboxyl group-bearing derivative monomer and the diamine group-bearing derivative monomer or between the carboxyl group-bearing derivative monomer and the glycol group-bearing derivative monomer may be conducted in accordance with the condensation polymerization process.

Specific examples of such aromatic ring-bearing compound's derivative are 2-vinylnaphthalene; 2-vinylpiridine; 9-vinylanthracene; 9,10-anthracenedipropioic acid; 9,10-bis(phenylethynyl)anthracene; and 5,12-bis(phenylethynl)naphthalene.

The aromatic ring structure-bearing high molecular material (B) may be a high molecular material obtained by subjecting any of the foregoing derivative monomers and an appropriate high molecular material having a side chain group to substitution reaction to substitute the side chain group of the latter by the former. Alternatively, the aromatic ring structure-bearing high molecular material (B) may be a high molecular material obtained by subjecting any of the foregoing derivative monomers to the foregoing electro-polymerization process.

A description will be made of the fluororesin (C) which is usable as the insulating or semiconductor material in the present invention follows.

The fluororesin (C) can include fluroresins having a carbon-fluorine bond. Of these fluororesins, those having an ether bond are the most appropriate because they desirably serve as the insulating or semiconductor material used in the anode active material-retaining body.

Specific examples such fluororesins having a carbon-fluorine bond and an ether bond are copolymers of ethylene fluoride with an vinyl monomer such as vinyl ether, dioxol, dioxine, or dioxene, respectively having an ether bond, or with a diene monomer derivative; and copolymers of an diene compound such as ethylene with vinyl ether, dioxol, dioxine, or dioxene, respectively having a fluorinated ether bond, or with a diene monomer derivative.

The ethylene fluoride can include ethylene fluoride derivatives such as ethylene terafluoride, chloroethylene trifluoride, vinylidene fluoride, and vinyl fluoride.

Any of the above ether bond-bearing ethylene fluoride copolymers may be obtained by way of solution polymerization, suspension polymerization, bulk polymerization or emulsion polymerization by using an polymerization initiator such as a peroxide compound or alkyl boron, or by using light or radiant rays.

A description will be made of the silicone resin (D) which is usable as the insulating or semiconductor material used in the anode active material-retaining body in the present invention follows.

The silicon resin (D) can include silicone resins having a carbon-metal bond. Specific examples of this silicone resin are silicone resins obtained from organic silicon compounds such as alcoxy silane, alkyl silane, halogenated silane, and siloxane; silicone resins obtained from silane derivatives such as silane derivatives having a vinyl group, amino group, epoxy group, methacryl group, or mercapto group; silicone resins obtained from hydrogen-modified polysiloxanes, vinyl-modified polysiloxanes, carboxy-modified polysiloxanes, chlorine-modified polysiloxanes, epoxy-modified polysiloxanes, metacryloxy-modified polysiloxanes, mercapto-modified polysiloxanes, fluorine-modified polysiloxanes, long chain-modified polysiloxanes, or phenyl-modified polysiloxanes; alkyleneoxide-modified silicone-modified siloxane copolymers; silicone-modified copolymers; alcoxysilane-modified polymers; silicone-modified urethanes; and silicone-modified nylons.

In the following, description will be made of the anode collector of the anode.

The anode collector on which the foregoing anode active material-retaining body is disposed serves to supply an electric current so that it can be efficiently consumed for the battery reaction upon charging and discharging and to collect an electric current generated. The anode collector is therefore desired to be constituted by a material which has a high electrical conductivity and is inactive to the battery reaction.

The material by which the anode collector is constituted can include Ni, Ti, Cu, Al, Pt, V, Au, Zn, and alloys of two or more of these metals such as stainless steel. Of these, Al is not suitable in the case of a rechargeable zinc series battery.

The anode collector may may be shaped in a plate-like form, foil-like form, mesh form, porous form-like sponge, punching metal form, or expanded metal form.

CATHODE

The cathode in the present invention generally comprises a cathode collector, a cathode active material, an electrically conductive material, and a binding agent.

The cathode is usually formed, for example, by disposing a mixture of a cathode active material, an electrically conductive material and a binding agent on a member capable of serving as a cathode collector.

The binding agent is desired to be stable against an electrolyte (or an electrolytic solution) used in a rechargeable battery.

Specific examples of such a binding agent in the case where a nonaqueous series electrolyte is used are polyolefines such as polyethylene, polypropylene, ethylene-propylene copolymer, and ethylene-propylene-diene-terpolymer; and fluorine-containing resins (or fluororesins) such as tetrafluoroethylene polymer.

Specific examples of the binding agent in the case where an aqueous series electrolyte is used are polyvinyl alcohols, celluloses, and polyamides.

Any of the foregoing insulating or semiconductor materials used in the anode may be used also in the cathode as the binding agent for the cathode active material. In this case, there is provided an advantage of effectively preventing the generation or growth of a dendrite which will cause internal-shorts between the anode and the cathode upon repeating the charging and discharging cycle. Further, it is possible to form a number of pores so that they are spacedly distributed in the cathode, in the same way as in the case of the anode. In this case, there are provided advantages such that an ion dedicated for the battery reaction is readily diffused into the anode active material, and the cathode has cushioning properties such that the cathode is hardly deformed or cracked when it is repeatedly expanded or shrunk upon repeating the charging and discharging cycle, resulting in attaining a desirable rechargeable battery having a prolonged charging and discharging cycle life. As for the porosity of the pores spacedly distributed in the cathode, it is desired to be preferably in the range of 1% to 90% or more preferably in the range of 5% to 80%.

The electrically conductive material used in the cathode can include powdery or fibrous aluminum, nickel, stainless steel and graphite, and other than these, carbon blacks such as ketjen black and acetylene black. Of these, the aluminum material is not suitable in the case of a rechargeable zinc series battery.

The cathode collector of the cathode serves to supply an electric current so that it can be efficiently consumed for the battery reaction upon conducting the charging and discharging and to collect an electric current generated. The cathode collector is therefore desired to be constituted by a material which has a high electrical conductivity and is inactive to the battery reaction.

The material by which the cathode collector is constituted can include Ni, Ti, Al, Pt, V, Au, Zn, and alloys of two or more of these metals such as stainless steel.

The cathode collector may be shaped in a plate-like form, foil-like form, mesh form, porous form-like sponge, punching metal form, or expanded metal form.

A description will be made of the cathode active material usable in the present invention follows.

The cathode active material is different depending upon the kind of a rechargeable battery.

The cathode active material in the case of a rechargeable lithium battery:

As the cathode active material in the case of a rechargeable lithium battery, there is usually used a compound selected from the group consisting of transition metal oxides and transition metal sulfides. The elements of these transition metal oxides and transition metal sulfides can include elements partially having a d-shell or f-shell. Specific examples of such element are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pd, Pt, Cu, Ag and Au. Of these, Ti, V, Cr, Mn, Fe, Co, Ni and Cu are the most appropriate.

The cathode active material is desired to be comprised of any of the above transition metal oxides and transition metal sulfides, which is incolithium. with lithium. The lithium-containing cathode active material may be formed by a manner of obtaining a transition metal oxide or transition metal sulfide using lithium hydroxide or lithium salt. Alternatively, it may be formed by a manner of providing a mixture of a given transition metal oxide or transition metal sulfide, and lithium hydroxide, lithium nitrate, or lithium carbonate capable of being readily thermally decomposed, and subjecting said mixture to heat treatment.

The cathode active material in the case of a rechargeable zinc series battery:

As the cathode active material in the case of a rechargeable nickel-zinc battery, there is usually used nickel oxide or nickel hydroxide.

As the cathode active material in the case of a rechargeable zinc-oxygen battery which comprises a cathode collector, a catalyst, and a water repellant, there is used oxygen. This oxygen is usually supplied from the air. As the catalyst in this case, there is usually used porous carbon material, porous nickel material, or copper oxide. As the water repellant usable, there can be mentioned fluorine-containing resins such as porous tetrafluoroethylene resin.

As the cathode active material in the case of a rechargeable bromine-zinc battery, there is used bromine.

SEPARATOR

The separator is disposed between the anode and the cathode, and it serves to prevent the anode and the cathode from suffering from internal-shorts. In addition, the separator also serves to retain an electrolyte (or an electrolyte solution) for a rechargeable battery.

The separator is required to have a porous structure or a structure having a number of perforations capable of allowing lithium ion or hydroxide ion to pass therethrough and it is also required to be insoluble into and stable to the electrolyte solution.

The separator is usually constituted by a nonwoven fabric or a membrane having a micropore structure made of glass, polypropylene, polyethylene, fluorine-containing resin, or polyamide. Alternatively, the separator may be constituted by a metal oxide film or a resin film combined with a metal oxide respectively having a plurality of perforations. In a preferred embodiment, the separator is constituted by a multilayered metal oxide film. In this case, the separator effectively prevents a dendrite from passing therethrough and because of this, the occurrence of internal-shorts between the anode and the cathode is desirably prevented. In another preferred embodiment, the separator is constituted by an incombustible fluorine-containing resin, glass or metal oxide film. In this case, an improvement can be attained in terms of the safety even in the case where such internal-shorts should be unexpectedly occur.

ELECTROLYTE

In the present invention, there can be used an appropriate electrolyte as it is, a solution of said electrolyte dissolved in a solvent, or a material of said solution immobilized using a gelatinizing agent. However, an electrolyte solution obtained by dissolving an appropriate electrolyte in an solvent is usually used in a way that said electrolyte solution is retained on the separator.

The higher the electrical conductivity of the electrolyte, the better. Particularly, it is desired to use such an electrolyte that the ionic conductivity at 25° C. is preferably $1 \times 10^{-3}$ S/cm or more, or more preferably, $5 \times 10^{-}$ S/cm or more.

The electrolyte used is different depending upon the kind of a rechargeable battery.

The electrolyte usable in the case of a rechargeable lithium battery:

The electrolyte usable in this case can include inorganic acids such as $H_2SO_4$, HCl and $HNO_3$; salts of $Li^+$ (lithium ion) with Lewis acid ion such as $BF_4^-$, $PF_6^-$, $ClO_4^-$, $CF_3SO_3^-$, or $BPh_4^-$ (with Ph being a phenyl group); and mixtures of two or more of said salts.

Other than these supporting electrolytes, salts of the above described Lewis acids ions with cations such as sodium ion, potassium ion, tetraalkylammonium ion, or the like are also usable.

In any case, it is desired that the above salts are used after they are subjected to dehydration or deoxygenation, for example, by way of heat treatment under reduced pressure.

The solvent in which the electrolyte is dissolved can include acetonitrile, benzonitrile, propylene carbonate, ethylene carbonate, dimethyl carbonate, diethyl carbonate, dimethylformamide, tetrahydrofuran, nitrobenzene, dichloroethane, diethoxyethane, 1,2-dimethoxyethane, chlorobenzene, γ-butyrolactone, dioxolan, sulfolan, nitrometane, dimethyl sulfide, dimethoxyethane, methyl formate, 3-methyl-2-oxdazolydinone, 2-methyltetrahydrofuran, 3-propylsydonone, sulfur dioxide, phosphoryl chloride, thionyl chloride, sulfuly chloride, and mixtures of two or more of these.

These solvents are preferably subjected to dehydration using activated alumina, molecular sieve, phosphorous pentaoxide, or calcium chloride, prior to their use. Alternatively, the solvents may be subjected to distillation in an atmosphere composed of inert gas in the presence of an alkali metal, wherein moisture and foreign matters are removed.

In order to prevent leakage of the electrolyte solution, it is desired for the electrolyte solution to be gelatinized using an appropriate gelatinizing agent.

The gelatinizing agent usable in this case can include polymers having a property such that it absorbs the solvent of the electrolyte solution to swell. Specific examples of these polymers are polyethylene oxide, polyvinyl alcohol, and polyacrylamide.

The electrolyte usable in the case of a rechargeable zinc series battery:

The electrolyte usable in this case can include alkalis such as potassium hydroxide, sodium hydroxide, lithium hydroxide, and the like; and inorganic salts such as zinc bromide and the like.

As the solvent for these electrolytes in order to obtain an electrolyte solution for the rechargeable zinc series battery, water is usually used.

In order to prevent leakage of the electrolyte solution, it is desired for the electrolyte solution to be gelatinized using an appropriate gelatinizing agent.

The gelatinizing agent usable in this case can include polymers having a property such that it absorbs the aqueous electrolyte solution to swell. Specific examples of these polymers are polyethylene oxide, polyvinyl alcohol, and polyacrylamide. Other than these, starch is also usable.

SHAPE AND STRUCTURE OF RECHARGEABLE BATTERY

There is no particular limitation for the shape of the rechargeable battery according to the present invention.

The rechargeable battery according to the present invention may be in the form of a flat round shape (or a coin-like shape), a cylindrical shape, a prismatic shape, or a sheet-like shape.

In the case where the rechargeable battery is shaped in a spiral-wound cylindrical form, the anode, separator and cathode are arranged in the named order and they are the battery area can be advantageously increased as advantages such that the battery area can be increased as desired and a high electric current can flow upon charging and discharging.

In the case where the rechargeable battery is shaped in a prismatic form, there is provided an advantage that the space of a device for housing the rechargeable battery can be effectively utilized.

The structure of the rechargeable battery according to the present invention can be optionally made of a single layer structure or a stacked structure.

Figure 3:
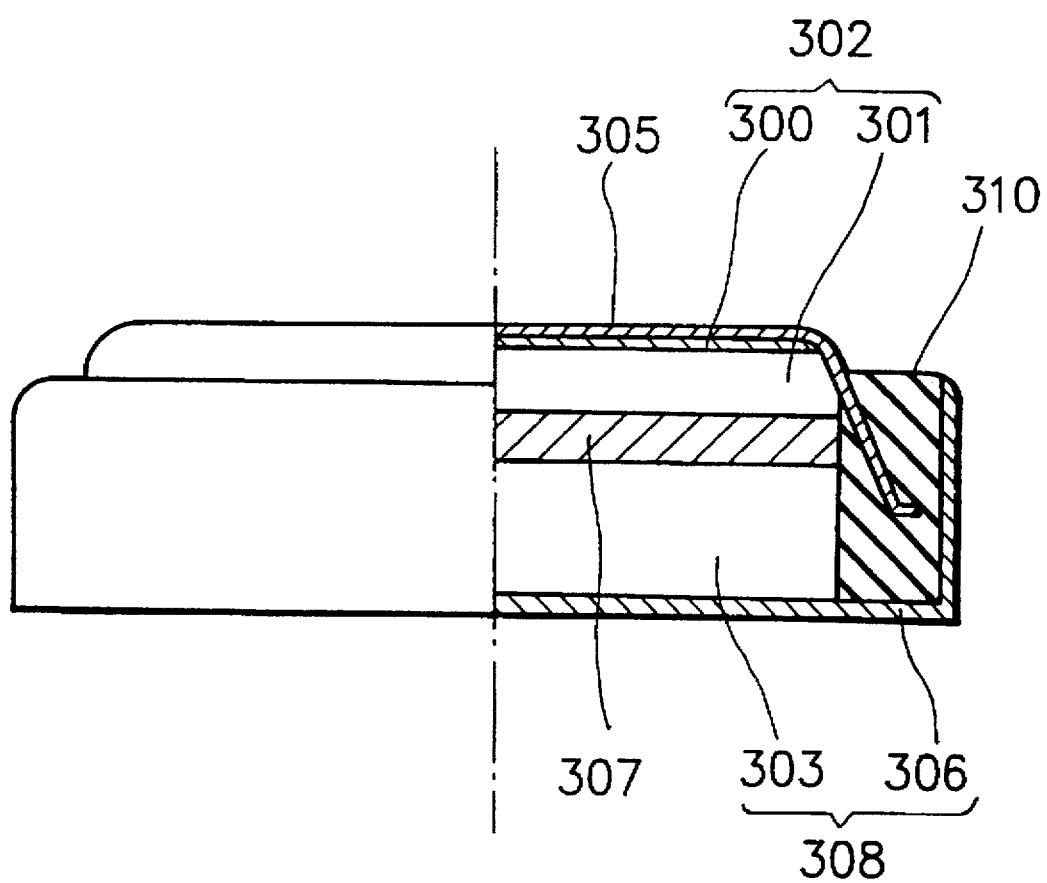
FIG. 3 is a schematic cross-sectional view illustrating an example of a single-layer system flat rechargeable battery according to the present invention.
Figure 4:
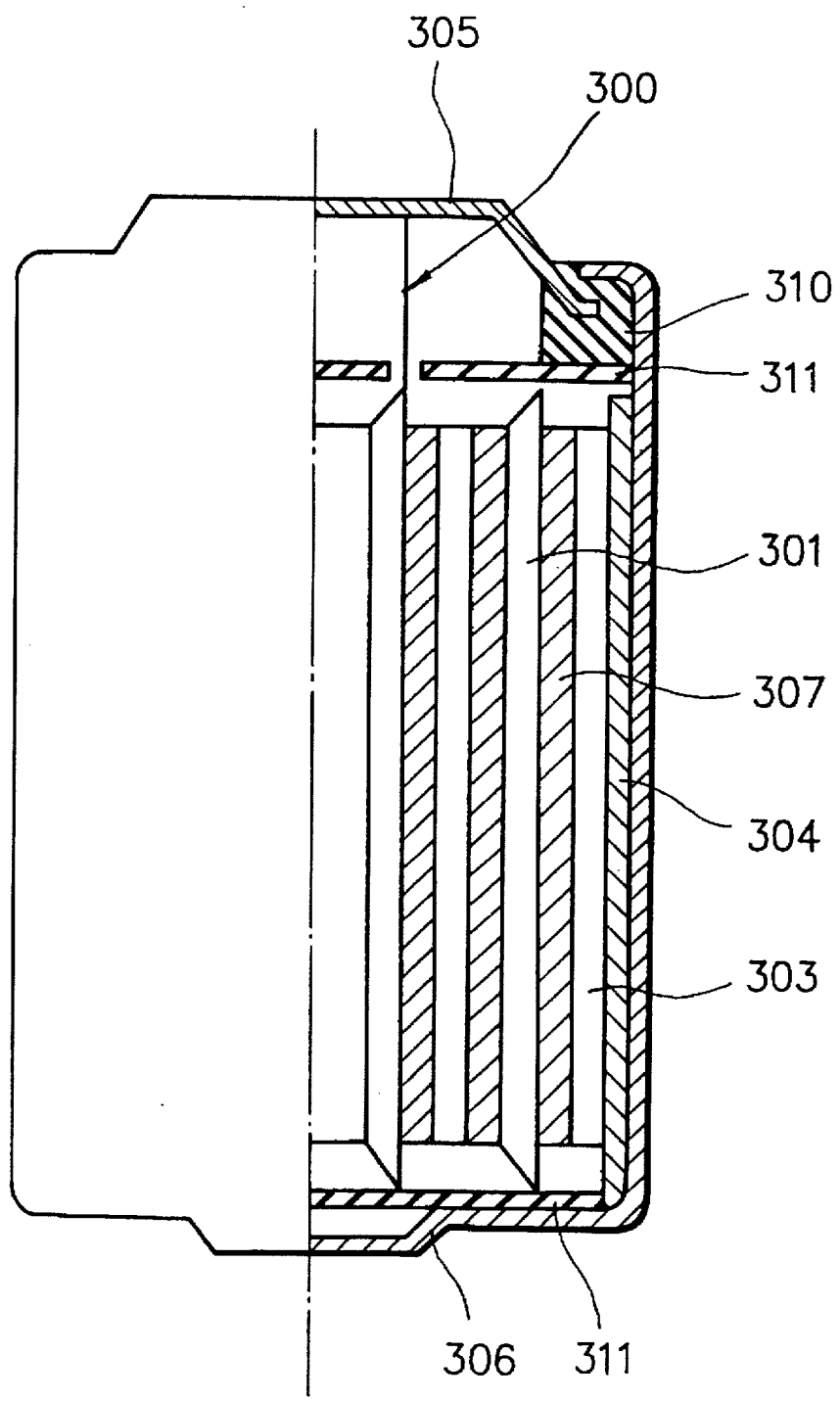
FIG. 4 is a schematic cross-sectional view illustrating an example of a spiral-wound cylindrical rechargeable battery according to the present invention.

FIG. 3 is a schematic cross-sectional view illustrating an example of a single-layer structure type flat rechargeable battery according to the present invention. FIG. 4 is a schematic cross-sectional view illustrating an example of a spiral-wound cylindrical rechargeable battery according to the present invention.

In FIGS. 3 and 4, reference numeral 300 indicates an anode collector, reference numeral 301 an anode active material (comprising the foregoing anode active material-retaining body according to the present invention), reference numeral 302 an anode, reference numeral 303 a cathode active material, reference numeral 304 (in FIG. 4) a cathode collector, reference numeral 305 an anode terminal (or an anode cap), reference numeral 306 a cathode can, reference numeral 307 a separator and an electrolyte (or an electrolyte solution), reference numeral 308 (in FIG. 3) a cathode, 310 an insulating packing, and reference numeral 311 (in FIG. 4) an insulating plate. In the configuration shown in FIG. 3, the cathode can 306 also serves as a cathode collector.

The fabrication of a rechargeable battery of the configuration shown in FIG. 3 or FIG. 4 is conducted, for example, in the following manner. That is, a combination comprising the separator 307 interposed between the anode 302 and the cathode active material 303 is positioned in the cathode can 306. Thereafter, the electrolyte is introduced thereinto. The resultant is assembled with the anode cap 305 and the insulating packing 310, followed by subjecting to caulking treatment. Thus, there is obtained the rechargeable battery.

The preparation of the constituent materials for the rechargeable lithium battery and the fabrication of said rechargeable battery are desired to be conducted in a dry air atmosphere free of moisture or a dry inert gas atmosphere free of moisture in order to prevent the occurrence of chemical reaction of lithium with water and also in order to prevent the rechargeable battery from being deteriorated due to chemical reaction of lithium with water in the inside of the battery.

As the constituent of the insulating packing 310, there can be used polypropylene resin, fluorine-containing resin, polyamide resin, polysulfone resin, or various rubbers. The sealing is typically conducted using a gasket such as the insulating packing, as shown in FIGS. 3 and 4. Other than this, it can be conducted by means of glass sealing, adhesive sealing, welding or soldering.

As the constituent of the insulating plate 311 shown in FIG. 4, there can be used organic resins and ceramics.

Any of the cathode can 306 and the anode cap 305 can be constituted by stainless steel, titanium clad steel, copper clad steel, or nickel-plated steel.

In any of the configurations shown in FIGS. 3 and 4, the cathode can 306 is designed to serve also as a battery housing. In the case where a battery housing is independently used, the battery casing can be constituted by a metal such as zinc, an alloy such as stainless steel, a plastic such as polypropylene, or a composite of a metal or glass fiber with plastic.

Although this is not shown in any of FIGS. 3 and 4, it is possible to employ an appropriate safety vent in any of the configurations shown in FIGS. 3 and 4. Use of a vent serves to ensure safety when the inside pressure of the rechargeable battery is incidentally increased, by connecting the inside of the rechargeable battery with the outside to thereby reduce the increased inside pressure of the rechargeable battery. The safety vent may be constituted by an elastic body comprising a rubber or spring or a rupture foil.

In the following, the present invention will be described in more detail with reference to examples, which are only for illustrative purposes but not intended to restrict the scope of the present invention to these examples.

EXAMPLE 1 AND COMPARATIVE EXAMPLE 1

Example 1

There was prepared a rechargeable lithium battery of the configuration shown in FIG. 3 in the following manner.
Formation of anode:
(1) Provision of an anode collector:
There was provided a 50 um thick aluminum foil as an anode collector. The aluminum foil was subjected to etching treatment using an aqueous solution containing 5 wt. % of potassium hydroxide to make it to have a roughened surface.
(2) Formation of an anode active material-retaining body on the anode collector:
And there was provided a coating paste obtained by mixing powdery aluminum as an electrically conductive material, a powdery fluororesin paint (trademark name: SUPERKONACK, produced by Nippon Oil & Fats Co., Ltd.) as an insulating or semiconductor material, and tetrafluoro lithium borate as a pore-forming material at a specific volume ratio of 40:10:50 based on their specific gravities so that a number of pores can be formed at a porosity rate of 50% in a layer to be formed to thereby obtain a mixture and mixing said mixture with xylene capable of serving as a solvent of eluting the pore-forming material. The coating paste was applied on the toughened surface of the aluminum foil to form a coat thereon. The coat thus formed on the aluminum foil was slowly dried at an environment temperature to thereby vaporize the xylene, followed by subjecting to drying at 170° C., whereby an anode active material-retaining body comprised of the electrically conductive material and the insulating material and containing a number of pores spacedly distributed therein was formed on the anode collector comprising the aluminum foil.

Thus, there was obtained an anode.
Formation of cathode:
Electrolytic manganese dioxide was mixed with lithium carbonate with a mixing weight ratio of 1:0.4, followed by subjecting to heat treatment at 800° C., to thereby obtain a lithium-manganese oxide. With the resultant lithium-manganese oxide, 3 wt. % of powdery acetylene black and 5 wt. % of powdery polyvinylidene fluoride were mixed. The resultant was mixed with N-methyl-2-pyrrolidone to obtain a paste-like product.

The resultant paste-like product was applied onto a surface of an aluminum foil as a cathode collector, followed by subjecting to drying. Thus, there was obtained a cathode.

Preparation of electrolyte solution:
There was provided a moisture-free mixed solvent composed of propylene carbonate (PC) and dimethoxyethane (DME) with an equivalent mixing ratio. 1M (mol/l) of tetrafluoro lithium borate was dissolved in the mixed solvent. Thus, there was obtained an electrolyte solution.
Separator:
There was provided a 25 um thick polypropylene member having a number of perforations as a separator.
Fabrication of rechargeable lithium battery:
The fabrication of a rechargeable lithium battery was conducted in a dry argon atmosphere. The separator was interposed between the cathode and the anode, and the resultant was inserted into a cathode can made of titanium clad steel. Then, the electrolyte solution was injected into the cathode can. The resultant was sealed using an anode cap made of titanium clad steel and an insulating packing made of fluoro rubber. Thus, there was obtained a rechargeable lithium battery.

Separately, the foregoing procedures for the formation of an anode were repeated to obtain an anode sample having an anode active material-retaining body (having a number of pores spacedly distributed therein) formed on an aluminum foil.

As for the pores formed in the anode active material-retaining body, their size distribution was examined by obtaining data using a specific surface analyzer AUTOSORB-1-MP (trademark name, produced by QUANTACHROME Company) and analyzing the data by the BJH method and the H-K method. As a result, it was found that the size distribution of the pores has a peak near 0.5 nm. In addition, the porosity rate of the pores spacedly distributed in the insulating or semiconductor material of the anode active material-retaining body was examined by means of a mercury porosimeter PORESIZER 9320 (produced by MICROMETRITICS Company). As a result, it was found that the porosity rate is about 54%.

Comparative Example 1

The procedures of Example 1 were repeated, except that in the formation of the anode active material-retaining body, no pore-forming material was used, to thereby obtain a rechargeable lithium battery.

Evaluation

As for each of the rechargeable lithium batteries obtained in Example 1 and Comparative Example 1, evaluation was conducted with respect to battery characteristics through the charging and discharging cycle test.

The charging and discharging cycle test was conducted in the following manner. That i.e., each rechargeable battery is placed in a charging and discharging device HJ-106M (produced by Hokuto Denko Kabushiki Kaisha), wherein charging and discharging are alternately repeated under conditions of 1 C (electric current of 1 time the electric capacity per an hour based on the electric capacity calculated from the cathode active material of each rechargeable battery) for the charging and discharging, and 30 minutes for the rest. As for other conditions, in the case of a rechargeable lithium battery, the cut-off voltage upon operating the charging was made to be 4.5 V and the cut-off voltage upon operating the discharging is made to be 2.5 V. Similarly, in the case of a rechargeable zinc series battery, the cut-off voltage upon charging was made to be 2.0 V and the cut-off voltage upon discharging is made to be 0.9 V.

The charging and discharging cycle test was initiated by operating the charging. In the charging and discharging test, as for each rechargeable battery, there were observed its battery capacity (that is, an energy density, namely, a discharge energy density) per a unit volume of the rechargeable battery and its charging and discharging cycle life. The battery capacity was based on the service capacity after the third repetition of the charging and discharging cycle. And the charging and discharging cycle life was based on the number of the charging and discharging cycle having been repeated until the battery capacity became less than 60% of the initial battery capacity.

The observed results obtained are collectively shown in Table 1. Each of the figures for Example 1 shown in Table 1 is a value relative to the corresponding value of Comparative Example 1, which was set at 1.

The results shown in Table 1 indicate that the rechargeable battery obtained in Example 1 has a prolonged charging and discharging cycle life and an excellent energy density which are greater than those of the rechargeable battery obtained in Comparative Example 1.

EXAMPLE 2 AND COMPARATIVE EXAMPLE 2

Example 2

There was prepared a rechargeable lithium battery of the configuration shown in FIG. 3 in the following manner.
Formation of anode:

(1) provision of an anode collector:

There was provided a 50 um thick aluminum foil as an anode collector.

(2) Formation of an anode active material-retaining body on the anode collector:

And there was provided a coating paste obtained by mixing a mixture comprising nickel ultra-fine powder material (having a specific surface area of 5 $m^2/g$) and flaked nickel material at a mixing weight ratio of 1:1 (as an electrically conductive material), crown polymer obtained by subjecting diaminodibenzo-18-crown-6 and terephthalic acid to condensation polymerization (as an insulating or semiconductor material), and tetrafluoro lithium borate as a pore-forming material at a specific volume ratio of 50:50:51 based on their specific gravities so that a number of pores can be formed at a porosity rate of 37% in a layer to be formed to thereby obtain a mixture and mixing said mixture with N-methyl-2-pyrrolidone capable of serving as a solvent of eluting the pore-forming material. The coating paste was applied on a surface of the aluminum foil to form a coat thereon. The coat thus formed on the aluminum foil was slowly dried at a temperature to thereby vaporize the N-methyl-2-pyrrolidone, followed by subjecting to drying at 170° C., whereby an anode active material-retaining body comprised of the electrically conductive material and the insulating material and containing a number of pores spacedly distributed therein was formed on the anode collector comprising the aluminum foil.

Thus, there was obtained an anode.
Formation of cathode:

Electrolytic manganese dioxide was mixed with lithium carbonate with a mixing weight ratio of 1:0.4, followed by subjecting to heat treatment at 800° C., to thereby obtain a lithium-manganese oxide. With the resultant lithium-manganese oxide, 3 wt. % of powdery acetylene black and 5 wt. % of powdery tetrafluoroethylene polymer were mixed. The resultant was mixed with N-methyl-2-pyrrolidone to obtain a paste-like product.

The resultant paste-like product was applied onto a surface of an aluminum foil as a cathode collector, followed by subjecting to drying. Thus, there was obtained a cathode.

Preparation of electrolyte solution:

There was provided a moisture-free mixed solvent composed of propylene carbonate (PC) and dimethoxyethane (DME) with an equivalent mixing ratio. 1M (mol/l) of tetrafluoro lithium borate was dissolved in the mixed solvent. Thus, there was obtained an electrolyte solution.
Separator:

There was provided a 25 um thick polypropylene member having a number of perforations as a separator.
Fabrication of rechargeable lithium battery:

The fabrication of a rechargeable lithium battery was conducted in a dry argon atmosphere. The separator was interposed between the cathode and the anode, and the resultant was inserted into a cathode can made of titanium clad steel. Then, the electrolyte solution was injected into the cathode can. The resultant was sealed using an anode cap made of titanium clad steel and an insulating packing made of fluoro rubber. Thus, there was obtained a rechargeable lithium battery.

Separately, the foregoing procedures for the formation of an anode were repeated to obtain an anode sample having an anode active material-retaining body (having a number of pores spacedly distributed therein) formed on an aluminum foil.

As for the pores formed in the anode active material-retaining body, their distribution in the insulating or semiconductor material was examined in the same manner as in Example 1. As a result, it was found that a number of pores are spacedly distributed at a porosity rate of about 37% in the insulating material of the anode active material-retaining body.

Comparative Example 2

The procedures of Example 2 were repeated, except that in the formation of the anode active material-retaining body, no pore-forming material was used, to thereby obtain a rechargeable lithium battery.

Evaluation

As for each of the rechargeable lithium batteries obtained in Example 2 and Comparative Example 2, evaluation was conducted with respect to battery characteristics in the manner described in the evaluation as for Example 1 and Comparative Example 1.

The evaluated results obtained are collectively shown in Table 2. Each of the figures for Example 2 shown in Table 2 is a value relative to the corresponding value of Comparative Example 2, which was set at 1.

The results shown in Table 3 indicate that the rechargeable battery obtained in Example 2 has a prolonged charging and discharging cycle life and an excellent energy density which are greater than those of the rechargeable battery obtained in Comparative Example 2.

EXAMPLE 3 and COMPARATIVE EXAMPLE 3

Example 3

There was prepared a rechargeable lithium battery of the configuration shown in FIG. 3 by repeating the procedures of Example 1, except that the anode was formed in the following manner.
Formation of anode:

(1) Provision of an anode collector:

There was provided a 50 um thick nickel foil as an anode collector.

(2) Formation of an anode active material-retaining body on the anode collector:

Tetrabutoxy titanium, isopropyl alcohol, water and hydrochloric acid were mixed, followed by subjecting to heat treatment at 60° C., to obtain a sol solution. With the sol solution, a mixture comprising natural graphite, carbon fiber and nickel ultra-fine powder material (as an electrically conductive material), poly(2-methyl-2-oxazoline in an amount capable of converting said tetrabutoxy titanium into a sintered titanium oxide body (as a insulating or semiconductor material) in an amount corresponding to 1/9 of the bulking value of the electrically conductive material upon the heat treatment at 600° C., and cyclohexanone were well mixed, to thereby obtain a coating paste.

The coating paste was applied on a surface of the nickel foil to form a coat thereon. The coat thus formed on the nickel foil was slowly dried at an environment temperature, followed by subjecting to heat treatment at 600° C., whereby an anode active material-retaining body comprised of the electrically conductive material and the insulating material and containing a number of pores spacedly distributed therein was formed on the anode collector comprising the nickel foil.

Thus, there was obtained a rechargeable lithium battery.

Separately, the foregoing procedures for the formation of an anode were repeated to obtain an anode sample having an anode active material-retaining body (having a number of pores spacedly distributed therein) formed on a nickel foil.

As for the pores formed in the anode active material-retaining body, their distribution was examined in the same manner as in Example 1. As a result, it was found that a number of pores are spacedly distributed at a porosity rate of about 24% in the insulating or semiconductor material of the anode active material-retaining body.

Comparative Example 3

The procedures of Example 3 were repeated, except that the anode was formed in the following manner, to thereby obtain a rechargeable lithium battery.

That is, natural graphite, carbon fiber, nickel ultra-fine powder material, and powdery polyvinylidene fluoride were mixed to obtain a mixture. Then, the mixture was mixed with N-methyl-2-pyrrolidone to obtain a coating paste.

The coating paste was applied on a surface of a nickel foil to form a coat thereon. The coat thus formed on the nickel foil was dried, followed by subjecting to heat treatment at 200° C., whereby an anode active material-retaining body comprised of the electrically conductive material and the insulating material was formed on the anode collector comprising the nickel foil.

Thus, there was obtained a rechargeable lithium battery.

Evaluation

As for each of the rechargeable lithium batteries obtained in Example 3 and Comparative Example 3, evaluation was conducted with respect to battery characteristics in the manner described in the evaluation as for Example 1 and Comparative Example 1. The evaluated results obtained are collectively shown in Table 3. Each of the figures for Example 3 shown in Table 3 is a value relative to the corresponding value of Comparative Example 3, which was set at 1.

The results shown in Table 3 indicate that the rechargeable battery obtained in Example 3 has a prolonged charging and discharging cycle life and an excellent energy density which are greater than those of the rechargeable battery obtained in Comparative Example 3.

EXAMPLE 4 AND COMPARATIVE EXAMPLE 4

Example 4

There was prepared a rechargeable nickel-zinc battery of the configuration shown in FIG. 3 in the following manner.

Formation of anode:

There was provided a copper punching metal as an anode collector.

80 parts by weight of a mixture composed of powdery zinc and powdery zinc oxide was mixed with 20 parts by weight of polyvinyl alcohol having a saponification value of 80% as a binder and 20 parts by weight of water to obtain a composition. The composition was mixed with a solution composed of ethyl alcohol and azobisisobutyronitrile in a predetermined amount, to thereby obtain a coating paste. The coating paste was applied on each of the opposite surfaces of the copper punching metal, followed by subjecting to press working while drying. The resultant was subjected to heat treatment at 150° C. under reduced pressure, followed by subjecting to crosslinking treatment with the irradiation of ultraviolet rays.

The copper punching metal thus treated was washed with water to remove uncrosslinked polyvinyl alcohol, followed by subjecting to freeze drying. Thus, there was obtained an anode.

The anode obtained was found to have a number of pores spacedly formed therein. The porosity rate of the pores formed was examined in the same manner as in Example 1. As a result, it was found to be about 17%.

Formation of cathode:

With a mixture obtained by mixing powdery nickel and nickel hydroxide, carboxymethyl cellulose as a binding agent and water were mixed to thereby obtained a paste-like product. The paste-like product was applied to a nickel foamed member (trademark name: CELLMET, produced by Sumitomo Electric Industries, Ltd.) to make the foamed member charged with the paste-like product. The resultant was dried, followed by subjecting to press working while drying. Thus, there was obtained a cathode.

Electrolyte solution:

There was provided an aqueous solution containing 30 wt. % of potassium hydroxide and lithium hydroxide.

Separator:

There was provided a hydrophilic treated 25 um thick polypropylene member having a number of perforations as a separator.

Fabrication of rechargeable nickel-zinc battery:

The fabrication of a rechargeable zinc-nickel battery was conducted in a dry argon atmosphere. The separator was interposed between the cathode and the anode, and the resultant was inserted into a battery housing (or a cathode can) made of titanium clad steel. Then, the electrolyte solution was injected thereinto. The resultant was sealed using an anode cap made of titanium clad steel and an insulating packing made of fluoro rubber. Thus, there was obtained a rechargeable nickel-zinc battery.

Comparative Example 4

The procedures of Example 4 were repeated, except that in the formation of the anode, neither the removal of the uncrosslinked polyvinyl alcohol nor the freeze drying were conducted, to thereby obtain a rechargeable nickel-zinc battery.

Evaluation

As for each of the rechargeable nickel-zinc batteries obtained in Example 4 and Comparative Example 4, evaluation was conducted with respect to battery characteristics in the manner described in the evaluation for Example 1 and Comparative Example 1.

The evaluated results obtained are collectively shown in Table 4. Each of the figures for Example 4 shown in Table 4 is a value relative to the corresponding value of Comparative Example 4, which was set at 1.

The results shown in Table 4 indicate that the rechargeable battery obtained in Example 4 has a prolonged charging and discharging cycle life and an excellent energy density which are greater than those of the rechargeable battery obtained in Comparative Example 4.

EXAMPLE 5 AND COMPARATIVE EXAMPLE 5

Example 5

There was prepared a rechargeable zinc-oxygen battery in the following manner.

Formation of anode:

A mixture composed of powdery zinc and powdery zinc oxide in an amount of 80 parts by weight was mixed with 20 parts by weight of polyvinyl alcohol having a saponification value of 99% as a binder and 20 parts by weight of water to obtain a composition. The composition was mixed with 2 parts by weight of sodium hydrogencarbonate to obtain a coating paste. The coating paste was applied on each of the opposite surfaces of a copper punching metal, followed by subjecting to press working while drying. The resultant was subjected to heat treatment at 80° C. to cause foaming, followed by subjecting to washing with methanol and then drying. Thus, there was obtained an anode.

The anode obtained was found to have a number of pores spacedly distributed therein. The porosity rate of the pores formed was examined in the same manner as in Example 1. As a result, it was found to be be about 41%.

Formation of cathode:

A mixture composed of acetylene black, manganese dioxide and cobalt dioxide was mixed with powdery polytetrafluoroethylene. The resultant mixture was mixed with a solution obtained by dissolving a powdery fluororesin paint SUPERKONACK (trademark name, produced by Nippon Oils & Fats Co., Ltd.) in an amount of 5 wt. % in xylene to obtain a paste-like product. The paste-like product was applied onto a surface of a nickel-plated copper mesh member, followed by drying, then subjecting to heat treatment at 170° C. under reduced pressure to harden the coating formed on the surface of the nickel-plated copper mesh member. The resultant was subjected to hot pressing treatment using a hot pressure roller to obtain a cathode.

Electrolyte solution:

There was provided a 28 wt. % potassium hydroxide aqueous solution containing lithium hydroxide as an electrolyte solution.

Separator:

There was provided a conventional cellophane separator for a rechargeable battery. Fabrication of rechargeable zinc-oxygen battery:

The separator was interposed between the anode and the cathode. The resultant was inserted into a cathode can made of titanium clad steel having air access holes. Then, the electrolyte solution was injected thereinto. The resultant was sealed using an anode cap made of titanium clad steel and an insulating packing made of fluoro rubber. Thus, there was obtained a rechargeable zinc-oxygen battery.

Comparative Example 5

The procedures of Example 5 were repeated, except that in the formation of the anode, no sodium hydrogencarbonate was used, to thereby obtain a rechargeable zinc-oxygen battery.

Evaluation

As for each of the rechargeable zinc-oxygen batteries obtained in Example 5 and Comparative Example 5, evaluation was conducted with respect to battery characteristics in the manner described in the evaluation for Example 1 and Comparative Example 1.

The evaluated results obtained are collectively shown in Table 5. Each of the figures for Example 5 in Table 5 is a value relative to the corresponding value of Comparative Example 5, which was set at 1.

The results shown in Table 5 indicate that the rechargeable battery obtained in Example 5 has a prolonged charging and discharging cycle life and an excellent energy density which are greater than those of the rechargeable battery obtained in Comparative Example 5.

Example 6

The procedures of Example 2 were repeated, except that in the formation of an anode, the specific volume ratio for the tetrafluoro lithium borate was varied into five different volume ratios so that a different porosity was provided in each case as shown in Table 6, to thereby obtain five different rechargeable lithium batteries.

As for each of the three rechargeable batteries, evaluation was conducted in the manner described in the evaluation for Example 1 and Comparative Example 1. The evaluated results obtained are collectively shown in Table 6. In Table 6, the evaluated results obtained in Example 2 are also shown for the comparison purposes. Each of the figures of Example 2 and Example 6 with respect to the charging and discharging cycle life and the energy density is a value relative to the corresponding value of Comparative Example 2, which was set at 1.

TABLE 1

|  | Example 1 | Comparative Example 1 |
|---|---|---|
| charging and discharging cycle life | 2.8 | 1.0 |
| energy density | 1.21 | 1.0 |

TABLE 2

|  | Example 2 | Comparative Example 2 |
|---|---|---|
| charging and discharging cycle life | 1.9 | 1.0 |
| energy density | 1.12 | 1.0 |

TABLE 3

|  | Example 3 | Comparative Example 3 |
|---|---|---|
| charging and discharging cycle life | 1.7 | 1.0 |
| energy density | 1.24 | 1.0 |

TABLE 4

|  | Example 4 | Comparative Example 4 |
|---|---|---|
| charging and discharging cycle life | 2.4 | 1.0 |
| energy density | 1.23 | 1.0 |

TABLE 5

|                              | Example 5 | Comparative Example 5 |
|------------------------------|-----------|----------------------|
| charging and discharging cycle life | 2.1       | 1.0                  |
| energy density               | 1.18      | 1.0                  |

TABLE 6

|               | Comparative Example 2 | Example 6 | | Example 2 | Example 6 | | |
|---------------|----------------------|-----------|---|-----------|-----------|---|---|
| porosity rate | 0 | 10 | 20 | 37 | 80 | 90 | 95 |
| charging and discharging cycle life | 1.0 | 1.4 | 1.6 | 1.9 | 2.0 | 1.1 | 0.9 |
| energy density | 1.0 | 1.07 | 1.10 | 1.12 | 1.11 | 1.05 | 0.75 |

What is claimed is:

1. A rechargeable battery comprising an anode, a cathode, a separator positioned between said anode and said cathode, and an electrolyte or an electrolyte solution disposed to contact with said anode and said cathode, wherein at least the anode has an anode active material-retaining body comprising (a) an electrically conductive material and (b) an insulating or semiconductor material having a property of allowing an ion generated during battery charging or discharging to pass through but not or substantially not allowing an anode active material deposited upon charging to pass through, said insulating or semiconductor material (b) having a structure with a number of pores distributed therein, and said anode active material-retaining body has a number of pores distributed therein at a porosity rate of 10% or more.

2. A rechargeable battery according to claim 1, wherein the anode has an anode collector.

3. A rechargeable battery according to claim 1, wherein the pores distributed in the anode active material-retaining body have a size distribution peak in a region of 0.15 nm to 100 nm.

4. A rechargeable battery according to claim 1, wherein the electrically conductive material is distributed in the insulating or semiconductor material.

5. A rechargeable battery according to claim 1, wherein the electrically conductive material is distributed in the anode active material-retaining body such that the electrically conductive material is so spaced in the insulating or semiconductor material to be in integral connection.

6. A rechargeable battery according to claim 1, wherein the electrically conductive material is so distributed in a matrix of the insulating or semiconductor material to be in integral connection.

7. A rechargeable battery according to claim 1, wherein the electrically conductive material has a plurality of islands having an integral connection.

8. A rechargeable battery according to claim 1, wherein the electrically conductive material comprises a plurality of islands which are so distributed in the insulating or semiconductor material to be in contact with each other.

9. A rechargeable battery according to claim 1, wherein the anode has cushioning properties such that anode is hardly deformed or cracked when the anode is repeatedly expanded or shrunk upon repeating charging or discharging cycle.

10. A rechargeable battery according to claim 2, wherein at least the electrically conductive material of the anode active material-retaining body is electrically contacted with the anode collector.

11. A rechargeable battery according to claim 2, the electrically conductive material is distributed in the anode active material-retaining body such that the electrically conductive material is so spaced in the insulating or semiconductor material to be in integral connection, wherein at least the electrically conductive material is electrically contacted with the anode collector.

12. A rechargeable battery according to claim 2, wherein the electrically conductive material is so distributed in a matrix of the insulating or semiconductor material to be in integral connection, wherein the electrically conductive material is electrically connected with the anode collector.

13. A rechargeable battery according to claim 2, wherein the electrically conductive material has a plurality of islands having an integral connection and the electrically conductive material is electrically contacted with the anode collector.

14. A rechargeable battery according to claim 2, wherein the electrically conductive material comprises a plurality of islands which are so distributed in the insulating or semiconductor material to be in contact with each other and at least the electrically conductive material is electrically contacted with the anode collector.

15. A rechargeable battery according to claim 1, wherein the insulating or semiconductor material comprises a member selected from the group consisting of organic high molecular materials, inorganic high molecular materials, and composites of these organic high molecular materials and inorganic high molecular materials.

16. A rechargeable battery according to claim 1, wherein the electrically conductive material has a configuration comprising one or more forms selected from a round form, flake form, chain form, sponge form, and combinations of two or more of these forms.

17. A rechargeable battery according to claim 1, wherein the electrically conductive material has a specific surface area of 1 $m^2/g$ or more.

18. A rechargeable battery according to claim 1, wherein the insulating or semiconductor material has a molecular structure having gaps with a size greater than the diameter of an ion dedicated for a battery reaction.

19. A rechargeable battery according to claim 1, wherein the insulating or semiconductor material has a molecular structure or micropores capable allowing an ion generated during battery charging or discharging to pass through but not or substantially not capable of allowing an anode active material deposited upon charging to pass through.

20. A rechargeable battery according to claim 1, wherein the insulating or semiconductor material is not reactive with or insoluble to the electrolyte or electrolyte solution.

21. A rechargeable battery according to claim 1, wherein the insulating or semiconductor material has an element or a group having an electron donating property.

22. A rechargeable battery according to claim 21, wherein the element having an electron donating property has an electron selected from the group consisting of unpaired electron, paired electron, and d-electron.

23. A rechargeable battery according to claim 21, wherein the group having an electron donating property has a $\pi$-electron.

24. A rechargeable battery according to claim 21, wherein the element having an electron donating property comprises at least an element selected from the group consisting of oxygen, nitrogen, and sulfur.

25. A rechargeable battery according to claim 1, wherein the insulating or semiconductor material has a macrocyclic molecular structure.

26. A rechargeable battery according to claim 1, wherein the insulating or semiconductor material has an aromatic ring molecular structure.

27. A rechargeable battery according to claim 1, wherein the insulating or semiconductor material is a fluororesin.

28. A rechargeable battery according to claim 1, wherein the insulating or semiconductor material has an ether bond.

29. A rechargeable battery according to claim 1, wherein the insulating or semiconductor material has a carbonyl group.

30. A rechargeable battery according to claim 1, wherein the insulating or semiconductor material has a double bond provided by phosphorous and nitrogen atoms.

31. A rechargeable battery according to claim 1, wherein the insulating or semiconductor material comprises a glassy metal oxide material.

32. A rechargeable battery according to claim 1, wherein the insulating or semiconductor material has a crosslinked molecular structure.

33. A rechargeable battery according to claim 1, wherein the electrically conductive material comprises one or more materials selected from carbon, graphite, Ni, Al, Cu, Ti, Pt, alloys of these metals, and stainless steel.

34. A rechargeable battery according to claim 1 in which an anode active material deposited upon charging is lithium.

35. A rechargeable battery according to claim 1 in which an anode active material deposited upon charging is zinc.

36. A rechargeable battery according to claim 1, wherein the cathode comprises a cathode active material, an electrically conductive material, and an insulating or semiconductor material.

37. A rechargeable battery according to claim 1, wherein the cathode contains a number of pores distributed therein a porosity of 5% or more.

38. A rechargeable battery according to claim 37, wherein the pores distributed has a size distribution peak in a region of 0.2 nm to 100 nm.

39. A rechargeable battery according to claim 36, wherein the insulating or semiconductor material of the cathode comprises a member selected from the group consisting of organic high molecular materials, inorganic high molecular materials, and composites of these organic high molecular materials and inorganic high molecular materials.

40. A rechargeable battery according to claim 36, wherein the electrically conductive material of the cathode has a configuration comprising one or more forms selected from a round form, flake form, chain form, sponge form, and combinations of two or more of these forms.

41. A rechargeable battery according to claim 36, wherein the insulating or semiconductor material of the cathode has an element or a group having an electron donating property.

42. A rechargeable battery according to claim 41, wherein the element having an electron donating property has an electron selected from the group consisting of unpaired electron, paired electron, and d-electron.

43. A rechargeable battery according to claim 41, wherein the group having an electron donating property has a π-electron.

44. A rechargeable battery according to claim 41, wherein the element having an electron donating property comprises at least an element selected from the group consisting of oxygen, nitrogen, and sulfur.

45. An anode for a rechargeable battery, said anode having an anode active material-retaining body comprising (a) an electrically conductive material and (b) an insulating or semiconductor material having a property of allowing an ion generated during battery charging or discharging to pass through but not or substantially not allowing an anode active material deposited upon charging to pass through, said insulating or semiconductor material (b) having a structure with a number of pores distributed therein, and said anode active material-retaining body having a number of pores distributed therein at a porosity rate of 10% or more.

46. An anode for a rechargeable battery according to claim 45, wherein the anode has an anode collector.

47. An anode for a rechargeable battery according to claim 45, wherein the pores distributed in the anode active material-retaining body have a size distribution peak in a region of 0.15 nm to 100 nm.

48. An anode for a rechargeable battery according to claim 45, wherein the electrically conductive material is distributed in the insulating or semiconductor material.

49. An anode for a rechargeable battery according to claim 45, wherein the electrically conductive material is distributed in the anode active material-retaining body such that the electrically conductive material is so spaced in the insulating or semiconductor material to be in integral connection.

50. An anode for a rechargeable battery according to claim 45, wherein the electrically conductive material is so distributed in a matrix of the insulating or semiconductor material to be in integral connection.

51. An anode for a rechargeable battery according to claim 45, wherein the electrically conductive material has a plurality of islands having an integral connection.

52. An anode for a rechargeable battery according to claim 45, wherein the electrically conductive material comprises a plurality of islands which are so distributed in the insulating or semiconductor material to be in contact with each other.

53. An anode for a rechargeable battery according to claim 45, wherein the anode has cushioning properties such that the anode is hardly deformed or cracked when the anode is repeatedly expanded or shrunk upon repeating charging or discharging cycle.

54. An anode for a rechargeable battery according to claim 46, wherein at least the electrically conductive material of the anode active material-retaining body is electrically contacted with the anode collector.

55. An anode for a rechargeable battery according to claim 46, the electrically conductive material is distributed in the anode active material-retaining body such that the electrically conductive material is so spaced in the insulating or semiconductor material to be in integral connection, wherein at least the electrically conductive material is electrically contacted with the anode collector.

56. A rechargeable battery according to claim 46, wherein the electrically conductive material is so distributed in a matrix of the insulating or semiconductor material to be in integral connection, wherein the electrically conductive material is electrically connected with the anode collector.

57. An anode for a rechargeable battery according to claim 46, wherein the electrically conductive material has a plurality of islands having an integral connection and the electrically conductive material is electrically contacted with the anode collector.

58. A rechargeable battery according to claim 46, wherein the electrically conductive material comprises a plurality of islands which are so distributed in the insulating or semiconductor material to be in contact with each other and at least the electrically conductive material is electrically contacted with the anode collector.

59. An anode for a rechargeable battery according to claim 45, wherein the insulating or semiconductor material comprises a member selected from the group consisting of organic high molecular materials, inorganic high molecular materials, and composites of these organic high molecular materials and inorganic high molecular materials.

60. An anode for a rechargeable battery according to claim 45, wherein the electrically conductive material has a configuration comprising one or more forms selected from a round form, flake form, chain form, sponge form, and combinations of two or more of these forms.

61. An anode for a rechargeable battery according to claim 45, wherein the electrically conductive material has a specific surface area of 1 m²/g or more.

62. An anode for a rechargeable battery according to claim 45, wherein the insulating or semiconductor material has a molecular structure having gaps with a size greater than the diameter of an ion dedicated for a battery reaction.

63. An anode for a rechargeable battery according to claim 45, wherein the insulating or semiconductor material has a molecular structure or micropores capable allowing an ion generated during battery charging or discharging not or substantially not capable of allowing an anode active material deposited upon charging to pass through.

64. An anode for a rechargeable battery according to claim 45, wherein the insulating or semiconductor material is not reactive with or insoluble to the electrolyte or electrolyte solution.

65. An anode for a rechargeable battery according to claim 45, wherein the insulating or semiconductor material has an element or a group having an electron donating property.

66. An anode for a rechargeable battery according to claim 65, wherein the element having an electron donating property has an electron selected from the group consisting of unpaired electron, paired electron, and d-electron.

67. An anode for a rechargeable battery according to claim 65, wherein the group having an electron donating property has a π-electron.

68. An anode for a rechargeable battery according to claim 65, wherein the element having an electron donating property comprises at least an element selected from the group consisting of oxygen, nitrogen, and sulfur.

69. An anode for a rechargeable battery according to claim 45, wherein the insulating or semiconductor material has a macrocyclic molecular structure.

70. An anode for a rechargeable battery according to claim 45, wherein the insulating or semiconductor material has an aromatic ring molecular structure.

71. An anode for a rechargeable battery according to claim 45, wherein the insulating or semiconductor material is a fluororesin.

72. An anode for a rechargeable battery according to claim 45, wherein the insulating or semiconductor material has an ether bond.

73. An anode for a rechargeable battery according to claim 45, wherein the insulating or semiconductor material has a carbonyl group.

74. An anode for a rechargeable battery according to claim 45, wherein the insulating or semiconductor material has a double bond provided by phosphorous and nitrogen atoms.

75. An anode for a rechargeable battery according to claim 45, wherein the insulating or semiconductor material comprises a glassy metal oxide material.

76. An anode for a rechargeable battery according to claim 45, wherein the insulating or semiconductor material has a crosslinked molecular structure.

77. An anode for a rechargeable battery according to claim 45, wherein the electrically conductive material comprises one or more materials selected from carbon, graphite, Ni, Al, Cu, Ti, Pt, alloys of these metals, and stainless steel.

78. An anode for a rechargeable battery according to claim 45 is for a rechargeable battery in which lithium is used as an anode active material.

79. An anode for a rechargeable battery according to claim 45 is for a rechargeable battery in which zinc is used as an anode active material.

80. A process for producing an anode for a rechargeable battery, said process comprises the steps of:

(i) providing a substrate capable of serving as an anode collector and a composition composed of (a) an electrically conductive material, (b) an insulating or semiconductor material having a property of allowing an ion generated during battery charging or discharging substantially not allowing an anode active material deposited upon charging to pass through, and (c) a material capable of forming pores, (ii) applying said composition onto a surface of said substrate to form a coat on said substrate, and (iii) r&moving said material (c) contained in said coat to form a number of pores spacedly distributed in said coat, whereby forming an anode active material-retaining body on said substrate.

81. The process according to claim 80 which comprises a step of subjecting the coat formed on the substrate in the step (ii) to heat treatment or reaction treatment.

82. The process according to claim 80, wherein the application of the composition outset substrate in the step (ii) is conducted by a coating process selected from the group consisting of dip coating, spray coating, coating by a coater, screen process printing, and roll coating.

83. A process for producing a rechargeable battery comprising an anode, a separator, a cathode, an electrolyte or an electrolyte solution, and a housing, said process is characterized by including a step of forming said anode, said step of forming comprising:

(i) providing a substrate capable of serving as an anode collector and a composition composed of (a) an electrically conductive material, (b) an insulating or semiconductor material having a property of allowing an ion generated during battery charging or discharging substantially not allowing an anode active material deposited upon charging to pass through, and (o) a material capable of forming pores, (ii) applying said composition onto a surface of said substrate to form a coat on said substrate, and (iii) removing said material (c) contained in said coat to form a number of pores spacedly distributed in said coat, whereby forming an anode active material-retaining body on said substrate.

84. The process according to claim 83, wherein the anode formation step further comprises a step of subjecting the coat formed on the substrate in the step (ii) to heat treatment or reaction treatment.

85. The process according to claim 83, wherein the application of the composition onto the substrate in the step (ii) is conducted by a coating process selected from the group consisting of dip coating, spray coating, coating by a coater, screen process printing, and roll coating.

86. A rechargeable battery according to claims 6, 8, 12, or 14, wherein the anode active material-retaining body is a layer having a surface region that is free of said electrically conductive material.

87. An anode for a rechargeable battery according to claims 50, 52, 56 or 58, wherein the anode active material-retaining body is a layer having a surface region that is free of said electrically conductive material.

* * * * *

UNITED STATES PATENT AND TRADEMARK OFFICE
CERTIFICATE OF CORRECTION

PATENT NO. : 5,698,339
DATED : December 16, 1997
INVENTOR(S) : SOICHIRO KAWAKAMI ET AL.                Page 1 of 8

It is certified that error appears in the above-identified patent and that said Letters Patent is hereby corrected as shown below:

On title page, item [30], FOREIGN APPLICATION PRIORITY DATA

"6-256418/HEI6" should read --6-256418--;
"7-260377/HEI7" should read --7-260377--.

COLUMN 1

Line 35, "posseses" should read --possesses--;
Line 40, "has" should read --have--;
Line 49, "while" should read --which--;
Line 55, "Under" should read --Under these--;
Line 67, "expected" should read --are expected--.

COLUMN 2

Line 17, "has" should read --have--;
Line 19, "ions" should read --ions,-- and "at an" should be deleted;
Line 20, "intercalation of its six-membered network" should be deleted;
Line 37, "having a" should read --having an--;
Line 41, "such" should read --such a--;
Line 42, "one" should be deleted;
Line 46, "film," should read --film;--.

COLUMN 3

Line 5, "Accordingly" should read --Accordingly, a--;
Line 26, "This" should read --The--;
Line 43, "over" should read --repeated over--.

UNITED STATES PATENT AND TRADEMARK OFFICE
CERTIFICATE OF CORRECTION

PATENT NO. : 5,698,339
DATED : December 16, 1997
INVENTOR(S) : SOICHIRO KAWAKAMI ET AL.

It is certified that error appears in the above-identified patent and that said Letters Patent is hereby corrected as shown below:

COLUMN 4

Line 35, "anode" should read --anode providing--;
Line 43, "(these" should read --(this--;
Line 53, "distributed" should read --contained--.

COLUMN 5

Line 2, "capacity" should read --capacity,--;
Line 14, "capacity" should read --capacity,--;
Line 67, "production" should read --production of--.

COLUMN 8

Line 20, "to" should be deleted.

COLUMN 9

Line 43, "confuguration" should read --configuration--.

COLUMN 10

Line 10, "serves" should read --serve--;
Line 20, "insulting" should read --insulating--;
Line 37, "obtained" should read --obtain--;
Line 39, "a" should read --on a--;
Line 60, "contains" should read --contain--.

UNITED STATES PATENT AND TRADEMARK OFFICE
CERTIFICATE OF CORRECTION

PATENT NO. : 5,698,339
DATED : December 16, 1997
INVENTOR(S) : SOICHIRO KAWAKAMI ET AL.

It is certified that error appears in the above-identified patent and that said Letters Patent is hereby corrected as shown below:

COLUMN 11

Line 13, "Methods" should read --Method-- and "(ii)" should read --(2)--;
Line 35, "manners" should read --methods--;
Line 66, "when" should read --upon--.

COLUMN 12

Line 1, "upon" should read --when--;
Line 7, "and" should read --an--;
Line 21, "eluting if" should read --eluting it. If--.

COLUMN 14

Line 24, "of" (first occurrence) should be deleted;
Line 27, "these" should read --of these--;
Line 28, "to two" should read --to contain two--;
Line 37, "com-" should be deleted;
Line 38, "prises" should be deleted;
Line 49, "will be made" should be deleted;
Line 64, "to" should be deleted;
Line 67, ", and In" should read --. In--.

UNITED STATES PATENT AND TRADEMARK OFFICE
CERTIFICATE OF CORRECTION

PATENT NO. : 5,698,339
DATED : December 16, 1997
INVENTOR(S) : SOICHIRO KAWAKAMI ET AL.

It is certified that error appears in the above-identified patent and that said Letters Patent is hereby corrected as shown below:

COLUMN 15

Line 15, "of at" should read --at--;
Line 17, "desired to be" should be deleted;
Line 42, "must a" should read --must have a--;
Line 56, "will be made" should deleted;
Line 62, "as an" should read --as a--.

COLUMN 16

Line 17, "addi-" should be deleted;
Line 18, "tionally" should be deleted.

COLUMN 17

Line 6, "forming" should read --formed--;
Line 13, "prior" should read --prior to--;
Line 16, "way" should read --by way--.

COLUMN 18

Line 66, "7on." should read --7-on.--.

COLUMN 19

Line 4, "eter);" should read --ether);--;
Line 18, "based" should read --based on--;
Line 19, "such as" (second occurrence) should be deleted;
Line 62, "will be made" should be deleted.

UNITED STATES PATENT AND TRADEMARK OFFICE
CERTIFICATE OF CORRECTION

PATENT NO. : 5,698,339
DATED : December 16, 1997
INVENTOR(S) : SOICHIRO KAWAKAMI ET AL.

It is certified that error appears in the above-identified patent and that said Letters Patent is hereby corrected as shown below:

COLUMN 20

Line 3, "such" should read --of--;
Line 5, "an" should read --a--;
Line 7, "an" should read --a--;
Line 17, "an" should read --a--;
Line 20, "will be made" should be deleted;
Line 56, "may" (second occurrence) should be deleted.

COLUMN 21

Line 4, "such" should be deleted;
Line 29, "desired to be" should be deleted--;
Line 51, "will be made" should be deleted.

COLUMN 22

Line 3, "incolithium," should read --incorporated--;
Line 54, "be" should be deleted;
Line 61, "in an" should read --in a--;
Line 67, "5X10˙S/cm" should read $5 \times 10^{-3}$ S/cm--.

COLUMN 23

Line 6, "ion" should read --ions--;
Line 10, "acids" should read --acid--;
Line 25, "sulfuly" should read --sulfur--.

UNITED STATES PATENT AND TRADEMARK OFFICE
CERTIFICATE OF CORRECTION

PATENT NO. : 5,698,339
DATED : December 16, 1997
INVENTOR(S) : SOICHIRO KAWAKAMI ET AL.

It is certified that error appears in the above-identified patent and that said Letters Patent is hereby corrected as shown below:

COLUMN 24

Line 3, "are the" should read --are spiral-wound. Because of this arrangement, the --;
Line 4, "advantages" should be deleted;
Line 5, "such that the battery area can be increased as" should be deleted;
Line 25, "reference" should read --reference numeral--;
Line 31, "310" should read --reference numeral (310--.

COLUMN 25

Line 44, "toughened" should read --roughened--.

COLUMN 26

Line 36, "MICROMETRITICS" should read --MICROMETRICS--.

COLUMN 28

Line 8, "um" should read --$\mu$m--;
Line 64, "um" should read --$\mu$m--.

COLUMN 29

Line 7, "(as a" should read --(as an--.

COLUMN 30

Line 28, "obtained" should read --obtain--.

UNITED STATES PATENT AND TRADEMARK OFFICE
CERTIFICATE OF CORRECTION

PATENT NO. : 5,698,339
DATED : December 16, 1997
INVENTOR(S) : SOICHIRO KAWAKAMI ET AL.

It is certified that error appears in the above-identified patent and that said Letters Patent is hereby corrected as shown below:

COLUMN 31

Line 49, "battery. Fabrication" should read --battery. (New Line) Fabrication"

COLUMN 34

Line 41, "capable" should read --capable of--.

COLUMN 35

Line 32, "has" should read --have--.

COLUMN 36

Line 38, "the" should read --wherein the--.

COLUMN 37

Line 13, "capable" should read --capable of--;
Line 14, "not" should read --to pass through but not--.

UNITED STATES PATENT AND TRADEMARK OFFICE
CERTIFICATE OF CORRECTION

PATENT NO. : 5,698,339
DATED : December 16, 1997
INVENTOR(S) : SOICHIRO KAWAKAMI ET AL.

It is certified that error appears in the above-identified patent and that said Letters Patent is hereby corrected as shown below:

COLUMN 38

```
Line 10, "discharging" should read --discharging to pass
   through but not or--;
Line 16, "r&moving" should read --removing--;
Line 38, "discharging" should read --discharging to pass
   through but not or--.
```

Signed and Sealed this

Fifteenth Day of September, 1998

Attest:

BRUCE LEHMAN

Attesting Officer

Commissioner of Patents and Trademarks